US012639053B2

(12) United States Patent
Vembu et al.

(10) Patent No.: US 12,639,053 B2
(45) Date of Patent: May 26, 2026

(54) COMPILE-TIME LINK TYPE OBJECT MANAGEMENT

(71) Applicant: Zoho Corporation Private Limited, Kanchipuram District (IN)

(72) Inventors: Sridhar Vembu, Tenkasi (IN); Akshhayaa S, Guduvanchery (IN); Padma J, Chennai (IN); Shalini Lakshmi A J, Chennai (IN); Siba Mishra, Puri (IN); Vanaja Ramaswamy, Chennai (IN); Balamurugan R, Chennai (IN); Balamurugan K E, Chennai (IN); Arvind Sudarshan K, Chennai (IN); Joseph Sathya Kumar, Chennai (IN); Suresh K V, Chengalpet District (IN); Baradhan V, Theni (IN); Sudheer A Grandhi, Pleasanton, CA (US)

( * ) Notice: Subject to any disclaimer, the term of this patent is extended or adjusted under 35 U.S.C. 154(b) by 166 days.

(21) Appl. No.: 18/405,699

(22) Filed: Jan. 5, 2024

(65) Prior Publication Data

US 2024/0241702 A1 Jul. 18, 2024

Related U.S. Application Data

(60) Provisional application No. 63/579,472, filed on Aug. 29, 2023, provisional application No. 63/487,362, filed on Feb. 28, 2023.

(30) Foreign Application Priority Data

Jan. 13, 2023 (IN) .............................. 202341002897
Sep. 5, 2023 (IN) .............................. 202341059666

(51) Int. Cl.
*G06F 8/41* (2018.01)
*G06F 9/54* (2006.01)

(52) U.S. Cl.
CPC ................ *G06F 8/427* (2013.01); *G06F 8/41* (2013.01); *G06F 8/436* (2013.01); *G06F 9/542* (2013.01)

(58) Field of Classification Search
CPC ........... G06F 8/41; G06F 8/427; G06F 8/436; G06F 9/542
See application file for complete search history.

(56) References Cited

U.S. PATENT DOCUMENTS 5,748,966 A 5/1998 Sato
7,694,274 B2 4/2010 Meijer et al.
(Continued)

FOREIGN PATENT DOCUMENTS

WO WO-0038073 A1 * 6/2000 ........... G06F 9/4493
WO 2000060455 10/2000

OTHER PUBLICATIONS

Event (computing), Wikipedia, 2021, 6 pages, [retrieved on Sep. 19, 2025], Retrieved from the Internet: <URL:https://web.archive.org/web/20210409061203/https://en.wikipedia.org/wiki/Event_%28computing%29>.*

(Continued)

*Primary Examiner* — Geoffrey R St Leger
(74) *Attorney, Agent, or Firm* — Silicon Edge Law Group LLP; Kevin J. Clark; Arthur J. Behiel

(57) ABSTRACT

A compile-time link type manager is defined to facilitate development of source code with disciplined link type object management at runtime. In one aspect, the link type manager ensures that all link type object management constructs have associated event handlers. Additionally, an event handler can be evaluated at compile time to ensure that it meets certain conditions for the particular link type, referred to as link-type criteria.

19 Claims, 10 Drawing Sheets

(56) References Cited

U.S. PATENT DOCUMENTS

| | | | | |
|---|---|---|---|---|
| 7,917,534 | B2 | 3/2011 | Demiroski et al. | |
| 10,929,106 | B1 | 2/2021 | Sridhar | |
| 2004/0172618 | A1* | 9/2004 | Marvin | G06F 8/36 |
| | | | | 717/116 |
| 2004/0268330 | A1* | 12/2004 | Grover | G06F 8/423 |
| | | | | 717/146 |
| 2006/0129584 | A1* | 6/2006 | Hoang | G06F 9/542 |
| 2012/0131598 | A1 | 5/2012 | Newport et al. | |
| 2014/0052433 | A1* | 2/2014 | Prasad | G06F 8/74 |
| | | | | 703/22 |
| 2014/0282443 | A1 | 9/2014 | Hoban et al. | |
| 2014/0380276 | A1 | 12/2014 | Matthiesen et al. | |

OTHER PUBLICATIONS

Jacobs, Bart "Four Clever Uses of Swift Extensions," cocoacasts. com/four-clever-uses-of-swift-extensions, May 3, 2017 (8 pages).
Johnson, Andrew "Why does Swift not allow stored properties in extensions", stackoverflow.com/questions/32873400/why-does-swift-not-allow-stored-properties-in-extensions, Sep. 30, 2015 (2 pages).
Kasyap, Krishna "How to convert a super class variable into a sub class type in Java," tutorialspoint.com/how-to-convert-a-super-class-variable-into-a-sub-class-type-in-java, Feb. 8, 2021 (3 pages).
Khan, Aasif "Extensions in Swift Explained," appypie.com/swift-extensions-how-to, Dec. 13, 2021 (8 pages).
Liang, "Chapter 11: Inheritance and Polymorphism, from Introduction to Java Programming," 10th Edition, 2015 (49 pages).
Miglani, Gaurav "Referencing Subclass objects with Subclass vs Superclass reference," geeksforgeeks.org/referencing-subclass-objects-subclass-vs-superclass-reference, Mar. 29, 2017 (9 pages).
Sengupta, Tirtharaj "Composition in Golang," geeksforgeeks.org/composition-in-golang, May 1, 2020 (5 pages).
Wikipedia, "Compiler," retrieved from "https://en.wikipedia.org/w/index.phptitle=Compiler oldid=1091156409", last edited on Jun. 2, 2022, at 15:06 (16 pages).

Wikipedia, "Role-Oriented Programming," retrieved from "https://en.wikipedia.org/w/index.phptitle=Role-oriented_programming oldid= 1065936286", last edited on Jan. 16, 2022, at 01:48 (3 pages).
Wilder, Noah, "How to make extension for multiple classes Swift," stackoverflow.com/questions/38464134/how-to-make-extension-for-multiple-classes-swift, Mar. 28, 2018 (4 pages).
Wikipedia, "Type system," retrieved from "https://en.wikipedia.org/wiki/Type_system", last edited on Mar. 18, 2024, at 16:52 (UTC) (16 pages).
"C++ Inheritance", https://www.tutorialspoint.com/cplusplus/cpp_inheritance.htm, accessed Mar. 26, 2024 (5 pages).
"Inheritance in C++", https://www.geeksforgeeks.org/inheritance-in-c/, May 25, 2017 last updated Jan. 8, 2024 (37 pages).
"Inheritance in Java", https://www.javatpoint.com/inheritance-in-java, accessed Mar. 26, 2024 (10 pages).
"Apache Groovy Object Orientation", groovy-lang.org /objectorientation.html, accessed Mar. 26, 2024 (67 pages).
"Python Inheritance", https://www.w3schools.com/python/python_inheritance.asp, accessed Mar. 26, 2024 (5 pages).
"Swift Inheritance", https://www.programiz.com/swift-programming/inheritance, accessed Mar. 26, 2024 (7 pages).
"Java Annotations",https://www.javatpoint.com/java-annotation, accessed Mar. 26, 2024 (23 pages).
Wikipedia, "Event-driven programming," retrieved from https://en.wikipedia.org/w/index.php?title=Event-driven_programming&oldid= 1201601754, last edited on Feb. 1, 2024, at 00:42 (4 pages).
Pozo Ramos, Leodanis, "Python Class Constructors: Control Your Object Instantiation", https://realpython.com/python-class-constructor/, Real Python, Mar. 14, 2022 (25 pages).
"Runtime Environments in Compiler Design", https://www.geeksforgeeks.org/runtime-environments-in-compiler-design/?ref= lbp, Jan. 13, 2017 (9 pages).
Subhash Singh, "Examination report under sections 12 & 13 of the Patents Act, 1970 and the Patents Rules, 2003." Intellectual Property India, Oct. 6, 2025, 8 pages.

* cited by examiner

100

400

700

720

800

820

COMPILE-TIME LINK TYPE OBJECT MANAGEMENT

CROSS REFERENCE TO RELATED APPLICATIONS

This application is related to U.S. Provisional Application 63/487,362 filed 28 Feb. 2023, U.S. Provisional Application 63/579,472 filed 29 Aug. 2023, Indian Provisional Application 202341002897 filed 13 Jan. 2023, and Indian Provisional Application 202341059666 filed 5 Sep. 2023, all entitled "COMPILE-TIME SUPPORT FOR ROLE-SHARING TYPES (RST) OBJECT MANAGEMENT", which are incorporated herein by reference.

FIELD OF THE INVENTION

Embodiments of the present disclosure are related, in general, to computer programming languages and more particularly, but not exclusively, to compile-time management of link type objects.

BACKGROUND

At the source code level, user-defined types pertain to structures, classes, interfaces, and other composite data types that programmers define to represent and manipulate complex data structures more effectively. These types go beyond the basic data types like int, float, and char that most languages offer inherently. User-defined types allow for the encapsulation of data and related functionality into cohesive units. At compile time, the compiler checks these types for syntactic and semantic correctness. This includes ensuring that the members of a class or structure are correctly defined, that methods are properly declared and implemented, and that any inheritance or interface implementation is correctly specified. The primary goal during this phase is to ensure that the code adheres to the language's syntax and semantics, and if it doesn't, to provide meaningful feedback to the developer.

Once the source code is compiled and becomes an executable, the user-defined types are transformed into machine code, ready for execution. At runtime, when these types are instantiated, memory is allocated for the resulting objects. For languages with manual memory management like C++, the developer allocates memory for objects using constructs like 'new' and releases memory with 'delete'. In contrast, languages with garbage collection, such as Java or C #, handle memory deallocation automatically once objects are no longer reachable. The runtime environment is responsible for managing the object lifecycle, ensuring that constructors are called when an object is created, and destructors (if applicable) are called when an object is destroyed. The management of these objects and the execution of associated methods form the core of runtime object management based on user-defined types.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Figure 1:
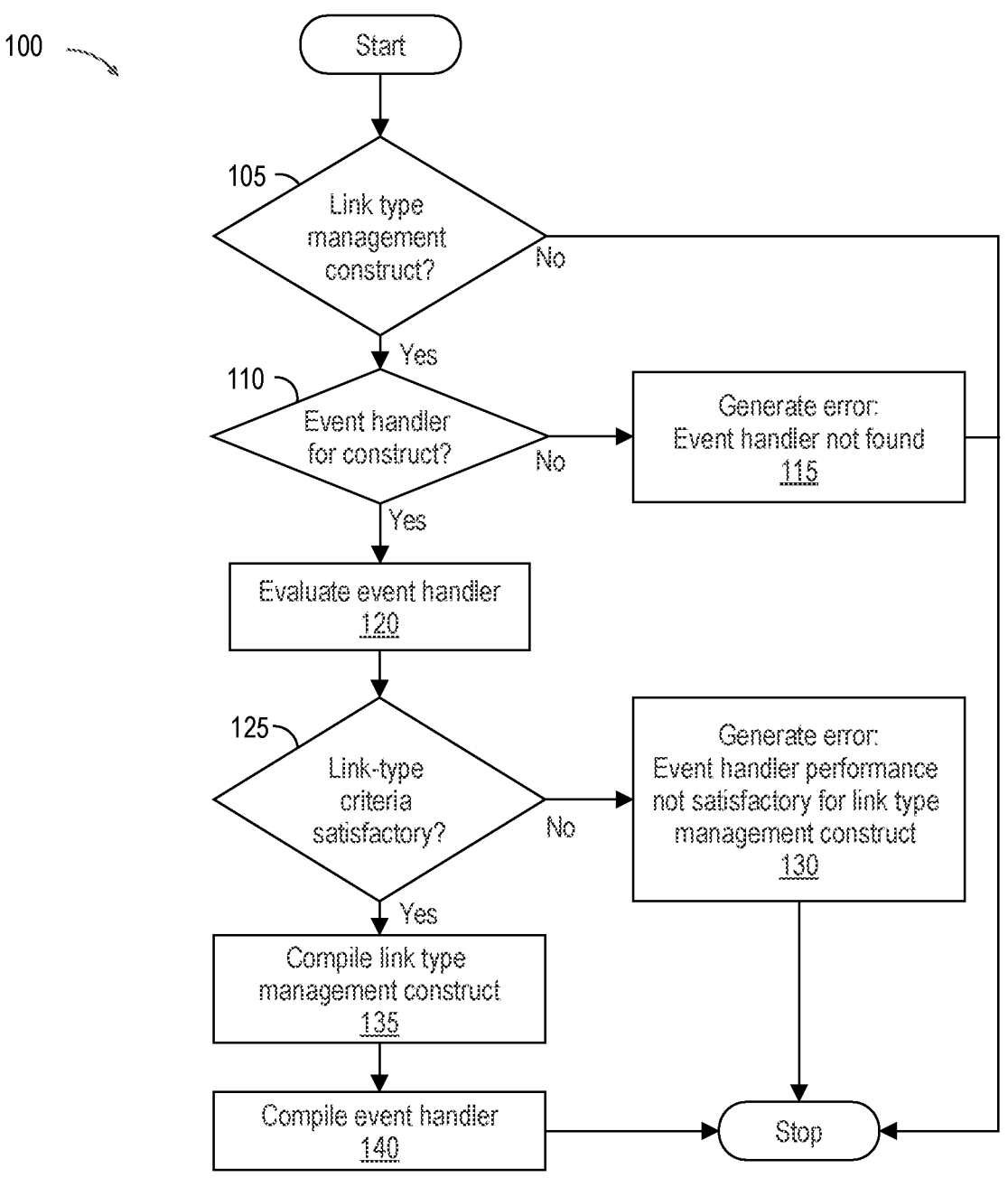
FIG. 1 is a flowchart 100 illustrating the function of a compile-time link type manager verifying satisfaction of event handler requirements for a link type object management construct at compile time.

A programming language provides for user defined types, which, when compiled, produce instructions for the use of objects of the defined type. Inheritance and type extensions support program maintenance and extensibility. Link types are defined wherein an Independent Data Type (IDT) is referenced in defining a Dependent-link Data Type (DDT). Examples of link types and dependencies, referred to therein as role sharing types and dependencies, are detailed in U.S. patent application Ser. No. 18/335,035 to Sridhar Vembu et al., filed 14 Jun. 2023, and entitled "Role Extensions For Programming Languages," which is incorporated herein by reference. Role sharing objects in the '035 application are referred to as linked objects herein. Linked objects may alternately be referred to as link or link-type objects. The types defined to instantiate linked objects are referred to as linked types. Described further below, an IDT object and a DDT object are linked, each is a link object, even though one is dependent upon the other. The terminology role-sharing and link terminology are interchangeable. The use of link herein does not imply any difference in capability, function, or scope.

Management functions are defined for creating, deleting, or updating objects based on user-defined types at run time. Each type is defined in source code. Source code also includes link type object management constructs to affect link type objects at run time. A variety of link type object management constructs can be defined for a programming language. For example, a create construct compiles into instructions that instantiate an object into physical memory during runtime, and a delete construct compiles into instructions that deletes an object and frees up physical memory during runtime.

A compile-time link type manager is defined to facilitate development of source code with disciplined link type object management at runtime. In one aspect, the link type manager ensures that all link type object management constructs have associated event handlers. Additionally, an event handler can be evaluated at compile time to ensure that it meets certain conditions for the particular link type, referred to as link-type criteria.

A construct in a programming language refers to a particular syntactic structure or a piece of code that performs a specific task. Constructs are the basic building blocks of a program, and they can include various elements such as data types (integers, strings, etc., as well as user-defined), variables, operators, control structures (if statements, for loops, while loops, etc.), functions and procedures, classes and objects, modules and packages, and exception handling constructs. A construct may be comprised of multiple constructs, such as a block of code. Each programming language has its own set of built-in constructs, and the way these constructs are used can vary from one language to another. An event handler construct comprises a keyword to identify it as an event handler and comprises one or more statements to be executed when a particular event occurs. An event handler for link type object management will be associated with a link type object management construct and comprise link-type criteria instructions to regulate link type object management at runtime.

FIG. 1 is a flowchart 100 illustrating the function of a compile-time link type manager verifying satisfaction of event handler requirements for a link type object management construct at compile time. Source code is evaluated for the presence of a link type object management construct (105). Compilation continues if none is found. When a link type object management construct is encountered, the source code is examined to determine if an event handler for the encountered link type object management construct is present (110). If not, then an error is generated (115) to indicate that the event handler was not found. In this case the link type object management construct is not compiled, and this process terminates. In one embodiment, the presence in source code of an associated event handler is sufficient as a minimum requirement to allow compilation to continue.

In another embodiment, the process continues by evaluating the event handler (120). It determines whether satisfactory predetermined criteria, referred to generally as link-type criteria, are included in the event handler (125). The event handler will include, directly or indirectly, the link-type criteria instructions which, when compiled, allow for certain conditions to be evaluated at runtime. Example link-type criteria includes determining the existence of an IDT object, determining whether a dependency such as a DDT object exists, and evaluation of constraints specific to an object management function (e.g., create, update, or delete) or specific to a link object type (e.g., IDT or DDT). These link-type criteria can vary in various embodiments, examples of which are detailed further below. If the defined link-type criteria are not sufficient (125), an error is generated to indicate that the event handler performance is not satisfactory for the link type object management construct (130). The link type object management construct and its associated event handler are not compiled, and this process terminates.

The embodiments detailed herein can be combined with other object management techniques. For example, built-in object management functions that are extensible to include constraints which, when evaluated, either allow to continue or abort the object management function at runtime. The built-in management functions are extensible in the type definition in source code. A compiler determining sufficient link-type criteria could take these extensions into consideration by not requiring a particular constraint in the event handler if it is being handled elsewhere. Extensible built-in object management functions are detailed in copending U.S. patent application entitled "Extensible Built-In Object Management," filed on the same day as the present application, by Sridhar Vembu et al., which is incorporated herein by reference (hereinafter the 'xxx application).

In another example, a general-purpose runtime object management engine is provided for affecting link-type objects at runtime that may include one or more of the desired link-type criteria built in. Again, the compiler can take into consideration any built-in link-type criteria and remove that from event-handler requirements, as appropriate. Example embodiments are detailed in copending U.S. patent application entitled "Runtime Support for Link Type Object Management," filed on the same day as the present application, by Sridhar Vembu et al., which is incorporated herein by reference.

When the event handler exists for the link type object management construct (110) and link-type criteria (if any) are satisfactory (125), then the link type object management construct is compiled (135) and the event handler is compiled as well (140).

Figure 2:
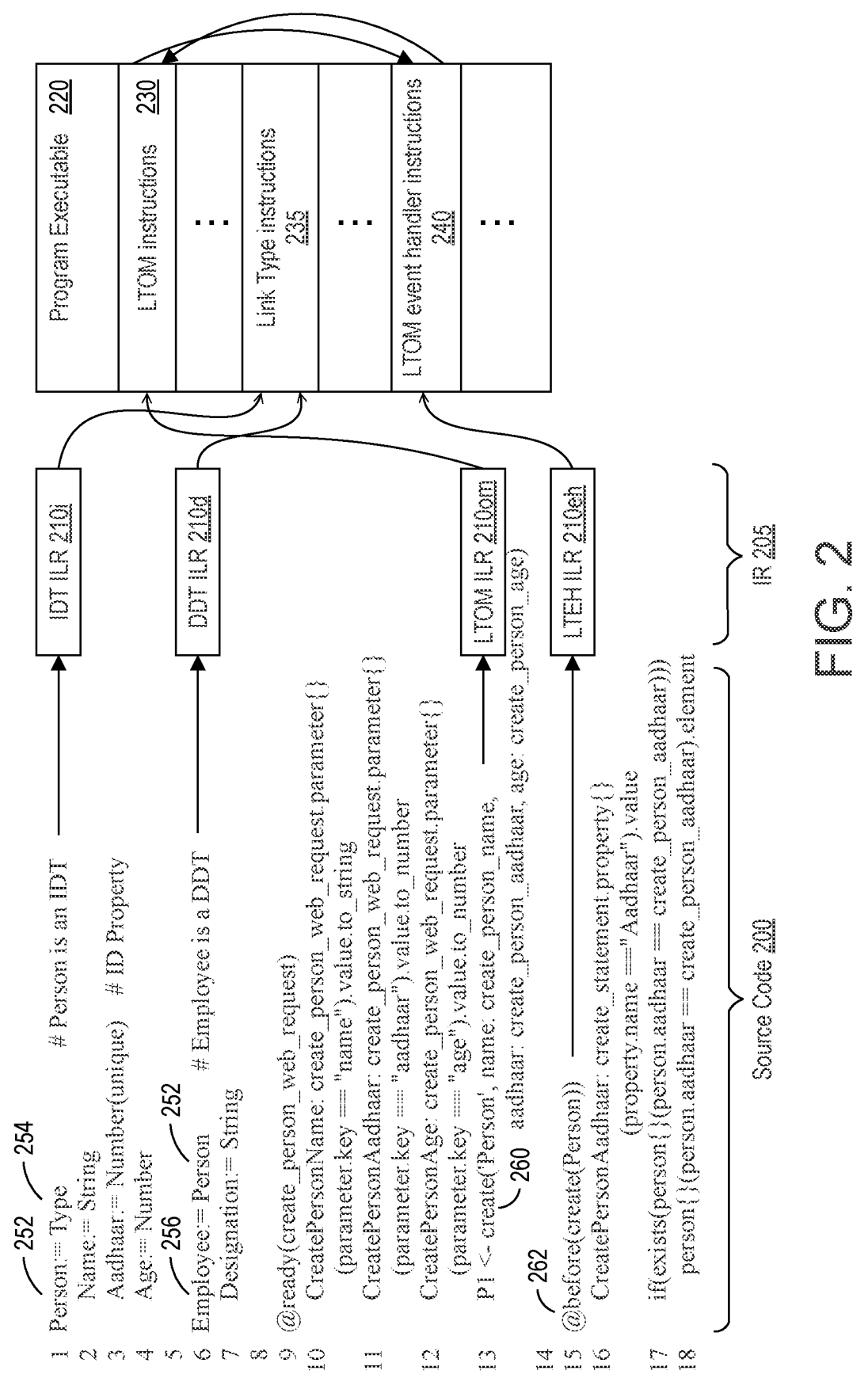
FIG. 2 illustrates how source code 200 written in accordance with one embodiment is compiled into an Intermediate Representation (IR) 205.

FIG. 2 illustrates how source code 200 written in accordance with one embodiment is compiled into an Intermediate Representation (IR) 205 with an Intermediate-Language Representation (ILR) 210 for each data type, each link type object management construct, and each link type construct event handler. In the source code, ":=" denotes a type or element declaration and ":" denotes element or object usage. The use of pascal case (PascalCase) for object and element identifiers indicates a declaration and the use of snake case (snake_case) represents object and element usage. The delimiter "#" identifies comments.

Lines 1-4 of source code 200 define Person 252 as a Type 254. This is an example of an Independent Data Type (IDT), as it is defined with the built-in construct Type. Person has property Name, which is a string, property Aadhaar, which is a number and is defined as a unique property. An Aadhaar is an identification number for people in India. A social security number (SSN) is a similar identifier in the United States. A Person also has numerical property, Age, in this example.

Lines 6-7 define Employee 256 as type Person 252. Employee 256 is an example of a Dependent-link Data Type (DDT) as it is derived from IDT Person 252. Employee and Person are link types, as a person object can be instantiated, and an employee object can be linked to that person object. In this example, an employee has property Designation, a string which identifies an attribute for the employee.

The creation or existence of a DDT type instance is dependent on the creation or existence of the corresponding IDT type instance, and the DDT instance or object is linked to the IDT object or instance automatically.

In various examples detailed herein, the IDT Person and DDT Employee are used for illustration. While linked types are quite useful for all sorts of human related roles and activities, they are by no means limited as such. A football player object IDT may have a jersey product DDT linked with it. An automobile object IDT may have tire object DDT associated with it. A hospital room object IDT may be linked with numerous medical equipment DDT objects. The number of various possible combinations of link types is quite unlimited. Link types are exemplified by the creation and existence of a DDT type object depending on the creation and existence of the corresponding IDT type object, with the DDT object being inherently linked to the IDT object. However, an IDT object can be persistent in memory even after a corresponding DDT is deleted (unless and until the IDT object is deliberately deleted).

Lines 9-13 illustrate source code which incorporates a link type object management construct 260, which is a create statement for Person, an IDT, in this example. The source code trigger @ready compiles into instructions that are executed during runtime, where the instructions invoke an operation on reception of a web request. Lines 10-12 are used to unmarshal the parameters like the values of 'name', 'aadhaar' and 'age' from the web request. The operation create_person_web_request invokes the create statement for type Person in line 13 where the unmarshalled parameters (using lines 10-12) of the web request are assigned to the arguments, namely "name", "aadhaar", and "age", respectively.

The "→" operator, shown preceding the create construct in line 13, is used when an object is created, updated, or deleted. In one embodiment, the function construct, such as create, delete, and update appear together with the →operator in source code, and instructions compiled therefrom invoke the object management instructions to execute the function. In an alternate embodiment, the object management construct, such as create, update, or delete, can be separated from the →operator, and the expression associated with the function can be built separately. Example embodiments with the →operator separable from the function construct are detailed in the aforementioned 'xxx application. In both examples, it is the →operator that invokes the object management instructions at runtime. As detailed further below, when an event handler is defined for the object management construct, then that event handler will be invoked prior to the object management instructions at runtime.

Lines 15-18 illustrate an exemplary event handler 262 for a link type object management construct applied to a link type. In line 15, (@before(create(Person)) identifies the event handler source code delineating the process to be executed (lines 16-18), during runtime, prior to executing the link type object management construct, create, on a link type, Person, an IDT. This example event handler produces instructions to check, at runtime, if the Person object identified by the create event (PI in line 13) already exists. To perform this check, the compiler validates the unique identifier ("aadhaar") of the Person. If the corresponding object exists, there is no need to create a duplicate, and the existing Person object will be returned to the create(Person) function call. In this sense, the event handler will prevent the instructions compiled from the create object management construct from affecting the object. Otherwise, a new Person object will be created using the information specified in line 13. Thus, the instructions compiled from the create object management will have succeeded in affecting the object as the link type object management function is performed.

Consider the function of a compile-time link type manager as illustrated in flowchart 100 as applied to the example source code 200 in FIG. 2. In other compile functions (detailed below with respect to FIG. 4A), the independent data type Person 252 is compiled into an IDT Intermediate-Language Representation (ILR) 210*i*. Similarly, the dependent-link data type Employee is compiled into DDT ILR 210*d*. Thus, the compiler already knows the link types within source code 200.

When the compile-time link type manager encounters the create construct statement (105) in line 13, it will check for the existence (110) of an event handler for that create construct. For illustration, assume lines 15-18 had not been added to source code 200. In this case, an error (115) is generated, and the code in lines 9-13 is ignored for continued compilation. Alternatively, when lines 15-18 are included, the compiler can verify that an event handler for the create construct for type Person exists. As described above, in one embodiment, this check may be sufficient, and the compiler then proceeds to compile (135) the link type object management (LTOM) construct 260 into LTOM ILR 210*om*. The compiler also compiles (140) the associated event handler 262, namely the link type event handler (LTEH), into LTEH ILR 210*eh*.

In an alternate embodiment, the compiler may evaluate the event handler 262 (120). If the link-type criteria are satisfactory, then the compilation of LTOM ILR 210*om* and LTEH ILR 210*eh* proceed as just described. In this example, the compile-time link type manager looks for the event handler to test for existence of the object, requiring a unique identifier. In the example, line 17 tests for the existence of a person based on the unique identifier aadhaar, and so the event handler 262 is deemed to have satisfied (125) the link-type criteria for creation of an IDT Person. In another situation, if the event handler did not contain code for which those link-type criteria would be satisfied, even though event handler 262 existed, an error (130) would be generated, and ILRs 107*om* and 107*eh* would not be compiled.

Intermediate representation (IR) 205 comprising ILRs 210 and any other compiled source code is further compiled, as necessary, to produce program executable 220. Program executable may be stored in memory, in a file (locally stored on a hard drive, or online in the cloud), or using any other method well known to those of skill in the art. LTOM ILR 210*om* is compiled to form machine executable instructions illustrated as LTOM instructions 230. LTEH ILR 210*eh* is compiled to form machine executable instructions illustrated as LTOM event handler instructions 240. The link type ILRs 210*i* and 210*d* are compiled to form link type instructions 235. The illustration of locations within program executable 220 is symbolic for illustration purposes only. The instructions may be non-contiguous, in any order, and may be combined and/or shared with other executable functions derived from source code 200. Note that LTOM instructions 230 is shown linked to LTOM event handler instructions, as a call to a link type object management instruction will necessitate a call to the respective event handler, which has been ensured to exist via the method of FIG. 1. Other instructions for interacting with a memory management system will be incorporated in program executable 220 as well, in an embodiment detailed in FIG. 3.

Event handlers can be tailored for each management function, such as create, update, or delete, and each data type, such as IDT, DDT, or types which operate as both IDT and DDT. The nomenclature delineating IDT and DDT is a convention. A type can be an IDT only, a DDT only, or it may be both. The compiler will know these linked relationships at compile time. If a type is both, it will be referred to as an IDT to its respective DDTs, even though that IDT/DDT type also has at least one IDT to which it is dependent.

Figure 3:
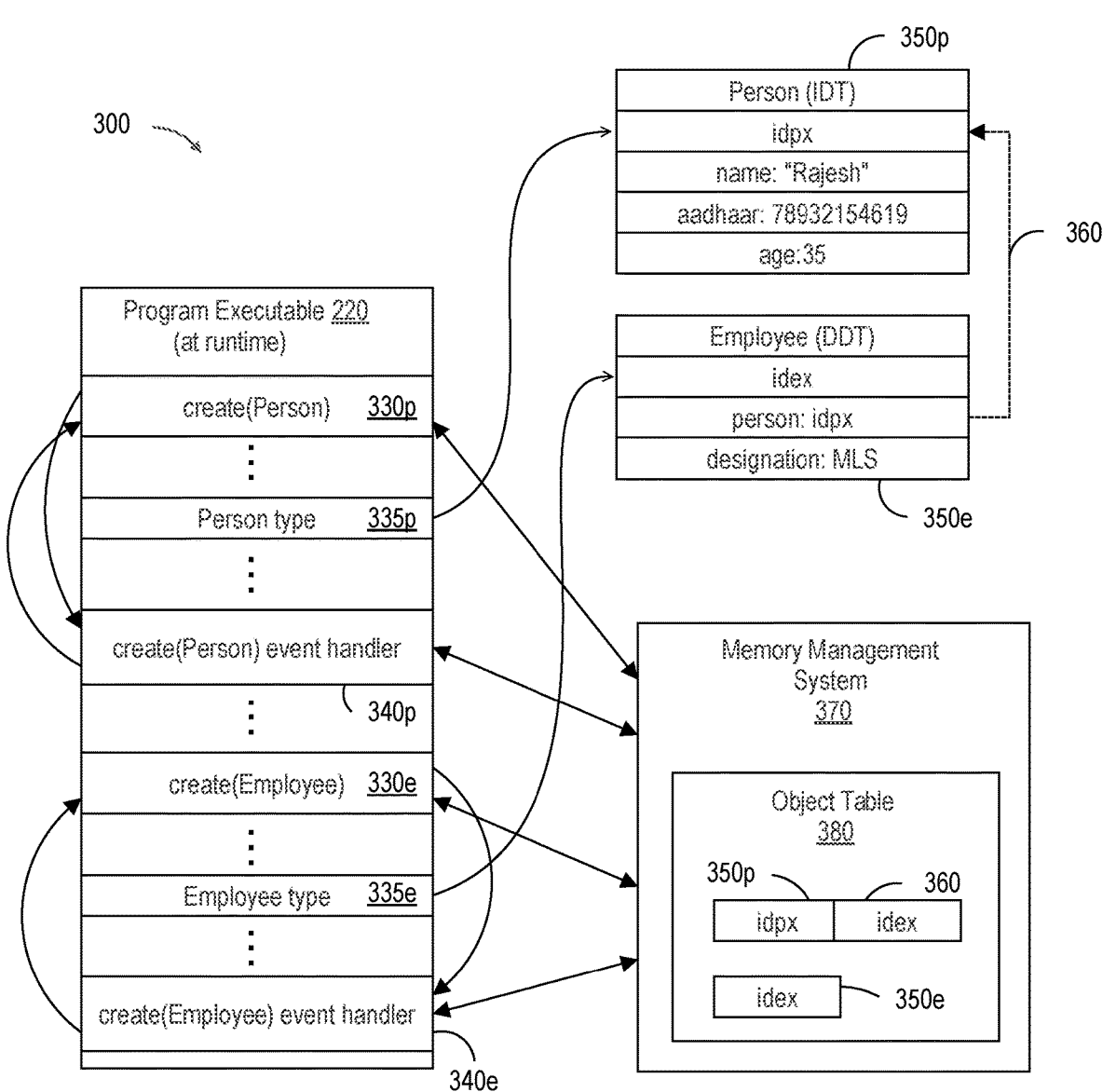
FIG. 3 illustrates a runtime environment having a memory 300 loaded with executable programs, which facilitate object management.

FIG. 3 illustrates a runtime environment in which a computer (not shown) having a memory 300 is loaded with executable programs, in this example, program executable 220 and memory management system 370, which, among other desired functionality of program executable 220, facilitate object management. Note that memory management system 370 is shown discretely for illustrative purposes only, they are collectively part of the executable code, and could be combined in various embodiments. This example illustrates the creation of link type objects, a Person (IDT) and an Employee (DDT).

Program executable 220 comprises machine code compiled from source code 200 and IR 205, as detailed above. Instructions to create an object of type Person, create(Person) 330*p*, are invoked by a runtime create request. Before the create request is carried out, the create (Person) event handler 340*p* is invoked (an IDT create handler, in this example), which was identified and verified during compile time as detailed in FIG. 1. The event handler 340*p* communicates with memory management system 370 to determine if the Person object already exists. Memory management maintains an object table 380, which contains (among other possible data) a list of existing objects and a list of dependencies for each object. Objects in the object table 380 may be identified by their type. They also may be associated with a unique identifier, such as Aadhaar, or SSN, as described above. Any number of alternate schemes may be deployed in alternate embodiments.

In this example, a request to create a person named Rajesh with Aadhaar 78932154619 was issued. Assume, for the moment, that a request to memory management system 370 from the event handler 340*p* regarding existence of a person with that Aadhaar number returned false, as the object table 380 did not contain such an object. Program execution returns to create(Person) 330*p*, which interfaces with memory management system 370 to create the Person object 350*p* for Rajesh, using instructions compiled for the Person type 335*p*. Memory is allocated, identified by system generated memory location idpx (a hypothetical label for an actual machine-readable memory location), and the object identifier idpx is stored in object table 380 for object 350*p*. Person (IDT) 350*p* is created in memory at the system generated location idpx, with properties name: "Rajesh", aadhaar: 78932154619, and age: 35. The Person type will have been known to be a link type during compile time. In this case it is an IDT, which means it may have one or more DDTs associated with it. There are no dependent objects at the moment in this example, but the memory management system will have a scheme for associating dependent objects to the independent object as they are generated. In this example, a list of dependent objects is maintained for each object type Person.

Now assume that a request to create an employee object associated with the person Rajesh is made during runtime. This is an example of a DDT create instruction. Create (Employee) instructions 330*e* are invoked, which in turn invoke the create(Employee) event handler 340*c*, which was identified and verified during compile time as detailed in FIG. 1. There are various procedures that can be employed in various embodiments for creating a DDT. Example code for create(Employee) event handler 340*e* is detailed below, with a discussion of various alternatives. For this illustration, the create(Employee) event handler 340*e* returns execution to create(Employee) 330*e* to create DDT object Employee 350*e*, a DDT dependent on Person 350*p*. Memory management system 370 provides a system generated memory location idex (a hypothetical label for an actual machine-readable memory location) for object Employee 350*c*, and program executable 220 populates that object with the property designation: MLS, and a dependent link 360, the location idpx, identifying the Person object is linked with this Employee object. Object table 380 will be updated to include object 350*e* in the list of objects. Dependent link 360 will be associated with object 350*p* as one of its dependencies.

Examples illustrating additional link type object management, such as delete IDT and delete DDT, are detailed further below. Such instructions reside similarly in program executable 220, and interface with memory management system 370 to delete objects and deallocate memory, accordingly, while maintaining object table 380 for each object.

The layout of memory 300 is illustrative only. Executable code can be loaded in any portion of memory, contiguously or otherwise, in similar order to the stored executable, or rearranged, or in any other configuration. The same is true for objects and other runtime data. It is common practice for instructions to be stored in a stack, and object data to be stored in a heap, but any memory management technique may be employed.

Overview of Compiler

A compiler is a program that translates source code instructions for performing computational functions into machine code that can be executed by a computer, alternatively referred to as binaries, executable code, execution code, application code, etc. Some languages are not compiled but are rather interpreted. Interpretation differs from compilation in that the interpreter executes programs directly from source code without producing a standalone executable. The following discussion focuses on compilers, but those of skill in the art will recognize compiling source code to an executable that is run on a computer can be substituted with a process of interpreting the source code while running on an interpreter.

Source code is typically written in a high-level programming language, which is designed to be easy to read and understand by developers. Intermediate representations and machine code are written in more compact and efficient lower-level languages. An intermediate representation generated from one form of source code can itself be a form of source code. The methods detailed herein can be applied to original source code or various levels of source code derived therefrom. A keyword from one form of source code may be transformed to or represented by a different keyword, numerical value, or token when processed into another form of source code or intermediate representation. A reference to a particular keyword in the methods, systems and devices described herein applies equally to any transformation or alternate representation.

Program execution generally takes place on computer hardware in a runtime environment. The computer hardware comprises processors, memory, and storage. The runtime environment is a set of software tools and resources that runs on the computer hardware to execute a program. The runtime environment includes the operating system, libraries, and other components that are necessary for the program to run. Computer hardware and runtime environments are well known to those of skill in the art, and an example of a prior art computer is detailed below in FIG. 10.

Figure 4A:
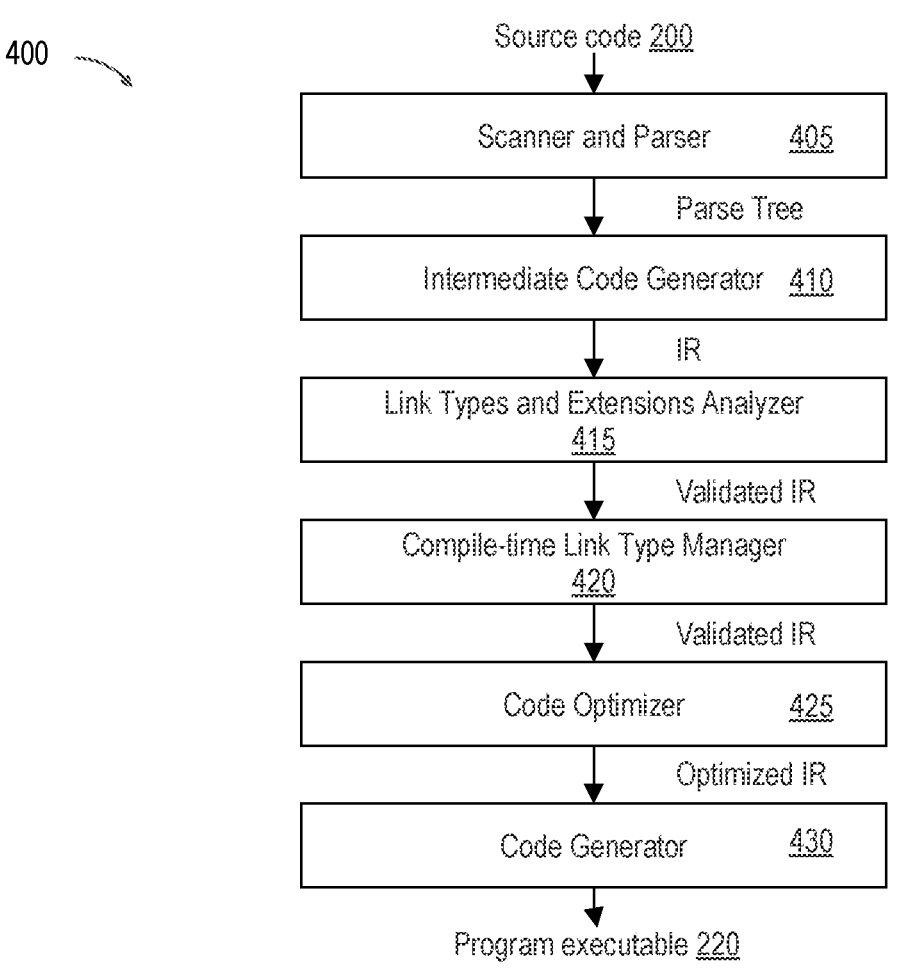
FIG. 4A is a flowchart 400 illustrating how a compiler passes through several phases to convert source code written in a high-level language into machine code, including enforcing rules for managing link types at compile time.

FIG. 4A is a flowchart 400 illustrating how a compiler passes through several phases to convert source code written in a high-level language into machine code, including enforcing rules for managing link types at compile time. Initially, the compiler scans and parses (405) the source code to generate a parse tree. The generated parse tree is then fed to an intermediate code generator (410) from which an Intermediate Representation (IR) of the source code is obtained.

Link types and extensions analyzer 415 operates on the IR to semantically validate link types, IDTs, DDTs, and extensions. Example embodiments are detailed in the '035 Vembu application incorporated by reference above. The result is a validated IR. As a result of this processing, the compiler has validated link types, and identified which are IDTs, which are DDTs, and which are both.

This validated IR is further processed by a compile-time link type manager (CT-LTM) (420) which performs functions as detailed with respect to FIG. 1, above. Other embodiments may employ different or additional compiler phases processing the validated IR for other purposes. The validated IR serves as an input to the code optimization phase (425) from which the optimized IR is obtained. A code generator (430) then creates a program executable 220, specific to a target processor.

Figure 4B:
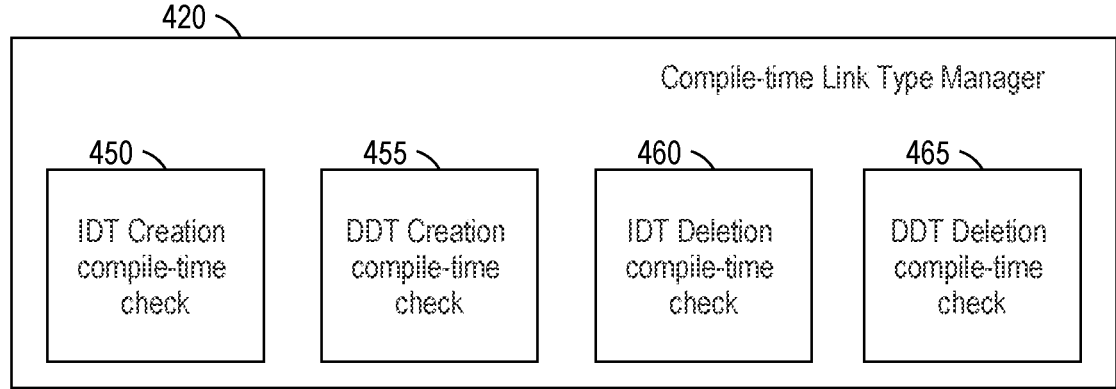
FIG. 4B depicts compile-time link type manager 420.

FIG. 4B depicts compile-time link type manager 420 of FIG. 4A in accordance with one embodiment. Link type object management constructs for link types are supported. There can be dependencies associated with the order of creation or deletion of IDT/DDT objects, as well as other criteria such as user-defined constraints and others. These dependencies and constraints, collectively referred as link-type criteria, should be satisfied before creation or deletion of IDT/DDT objects. Whenever create and delete statements for IDT and DDT types are identified by the compiler, the CT-LTM 420 automates the verification of link-type criteria defined at compile time to perform the required object creation or deletion at runtime.

Compile-time link type manager 420 includes IDT creation compile-time check (450), DDT creation compile-time check (455), IDT deletion compile-time check (460), and DDT deletion compile-time check (465). Example embodiments for each compile-time check are detailed below with illustrative code examples.

The CT-LTM displays error messages to the developer when the handler is not provided. The error messages are used to instruct the developer to provide necessary handlers in the source code that verify the link-type criteria and thereby assist in preparation for creation and deletion of IDT and DDT objects.

IDT Creation Compile-Time Check

When a create statement is recognized by the compiler for an IDT type, as identified by the Link Types and Extensions Analyzer 415, the CT-LTM 420 invokes the IDT Creation-CTC 450. One aspect is to ensure that a developer has written an IDT creation event handler. Lines 1-7 of source code 200 in FIG. 2 identify the IDT Person type and DDT Employee type that will be used to illustrate embodiments detailed below. As detailed above, lines 9-13 illustrate an example create IDT statement, and lines 15-18 illustrate an example IDT creation event handler.

Figure 5A:
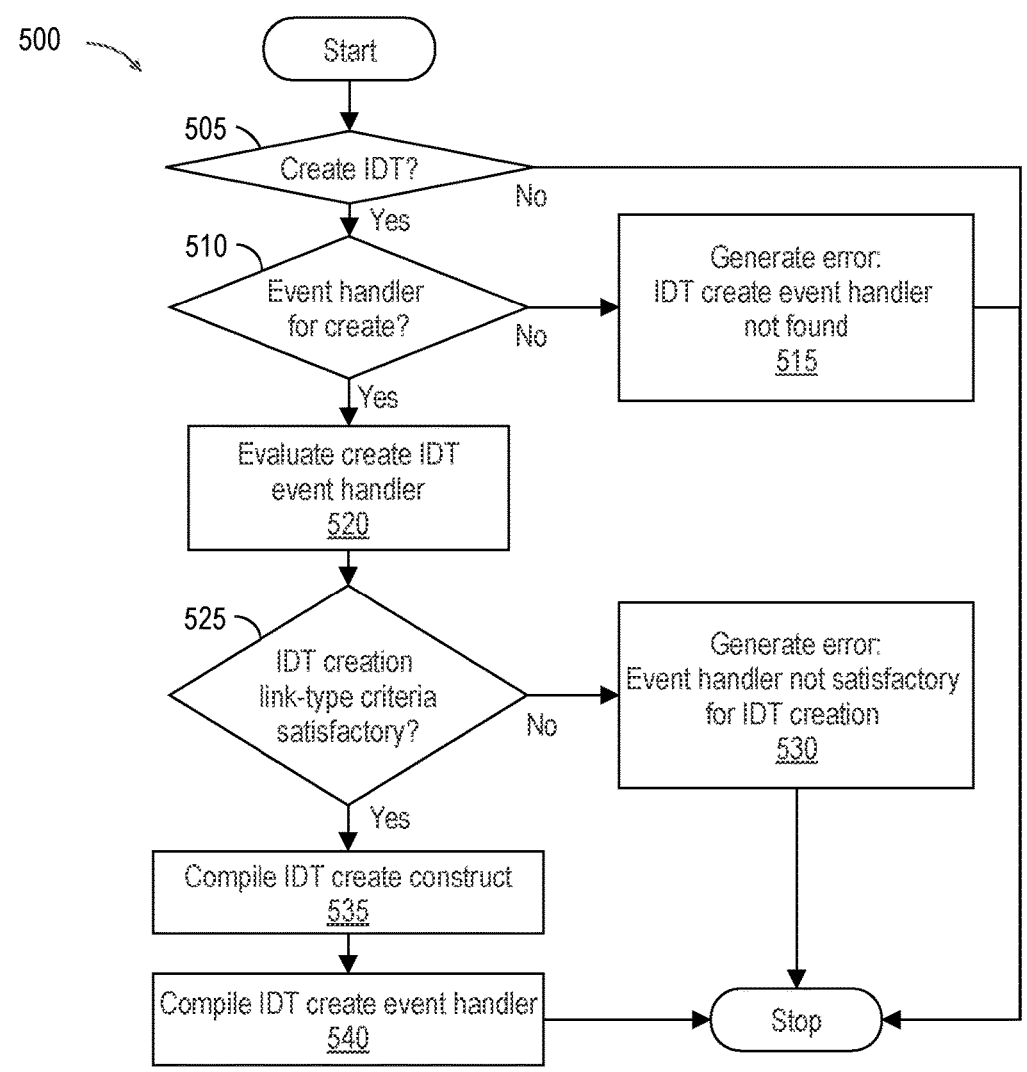
FIG. 5A is a flowchart 500 illustrating functions of IDT creation compile-time check 450 of FIG. 4B.

FIG. 5A is a flowchart 500 illustrating functions of IDT creation compile-time check 450 of FIG. 4B. Source code is evaluated for the presence of a create IDT construct (505). Compilation continues if none is found. When a create IDT construct is encountered, the source code is examined to determine if an event handler for the create IDT construct is present (510). If not, then an error is generated (515) to indicate that the IDT create event handler was not found. In this case the create IDT construct is not compiled and this process terminates. In one embodiment, the presence in source code of an associated IDT create event handler is sufficient as a minimum requirement to allow compilation to continue.

In another embodiment, the process continues by evaluating the create IDT event handler (520). It determines whether satisfactory IDT creation link-type criteria are included in the event handler (525). These link-type criteria can vary in various embodiments. If the defined link-type criteria are not sufficient (525), an error is generated to indicate that the event handler performance is not satisfactory for IDT creation (530). The link type object management construct and its associated event handler are not compiled, and this process terminates.

When the event handler exists for the link type object management construct (510) and IDT creation link-type criteria (if any) are satisfactory (525), then the IDT create construct is compiled (535) and the IDT create event handler is compiled as well (540). Note that, in some instances, there may be multiple create IDT constructs in source code, each of which share a single create IDT event handler. As such, the compile IDT create event handler (540) does not need to be repeated for additional IDT create instances of that type, and neither does the existence of the IDT event handler (510) or sufficiency thereof (520) need to be evaluated again.

Figure 5B:
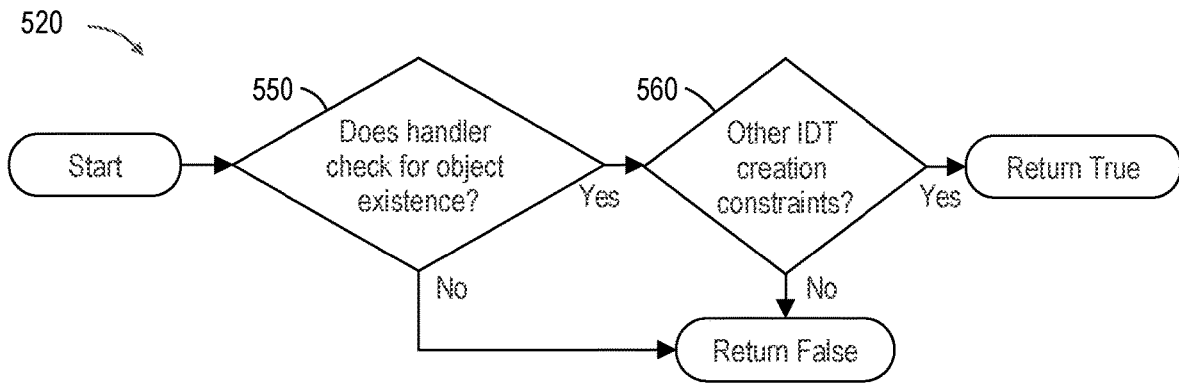
FIG. 5B is a flowchart of an example evaluation of a create IDT event handler.

FIG. 5B is a flowchart of an example evaluation of a create IDT event handler 520. In one embodiment, link-type criteria include checking the existence of an IDT (550). This ensures that a duplicate IDT is not created. If the IDT exists at runtime, it is fetched and used rather than creating a new one. If it does not exist, a new IDT object is created. If code for this check is not found in the event handler source code, then the flowchart returns a false value, and the IDT creation link-type criteria will be found unsatisfactory (525) and lead to an error (530). There may be other IDT creation constraints that make up the link-type criteria. The event handler is evaluated at compile time to ensure it checks for these as well if they are defined (560). If so, the event handler is sufficient, and a true value is returned (evaluated in 525). If not, a false value is returned, which will lead to an error (530).

The IDT creation event handler code, @before(create (Person)), referenced earlier, is shown in FIG. 2 lines 15-18. It is called in response to the IDT create construct (line 13). In this example, the trigger @ready(create_person_web_request), line 9, allows a web request for IDT creation at runtime. The create statement includes the IDT Person type and the IDT properties name, aadhaar and age. Here, p1 defines the person object. Lines 10-12 unmarshal the parameters like name, aadhaar and age respectively from the web request and assigns them to the variable references like CreatePersonName, CreatePersonAadhaar and CreatePersonAge respectively. Then line 13 uses these variable references to create an object of type 'Person'.

The create statement in line 13, invokes the create IDT event handler to be executed before creation of the IDT object occurs. In this example, before creation of an IDT object at runtime, the event handler checks whether the IDT already exists. If so, it will be used. Otherwise, the IDT object will be created using the information specified in line 13.

To perform this check, the compiler validates the unique identifier ("aadhaar") of the Person. In Line 16, an expression "CreatePersonAadhaar" is defined to extract the value of the IDT's unique property, "aadhaar". Line 17 performs the IDT existence check as follows: the compiler verifies that the aadhaar value corresponding to Person extracted in Line 16 (create_person_aadhaar) is equal to the aadhaar value of the Person, person.aadhaar, (if it exists) available in a database (such as object table 380, for example). If both aadhaar values are equal, it implies that the Person object already exists in the database. In Line 18, the existing Person object is to be used in "Person{ }" and creation of a duplicate IDT Person object is prevented. Otherwise, if the Person object does not exist, the compiler permits the creation of a new person object.

DDT Creation Compile-Time Check

When a create statement is recognized by the compiler for a DDT type, as identified by the Link Types and Extensions Analyzer 415, the CT-LTM 420 invokes the DDT Creation-CTC 455. One aspect is to ensure that a developer has written a DDT creation event handler. In another aspect, the event handler is evaluated at compile time to ensure it is enforcing the relevant link-type criteria prior to the DDT creation at runtime.

Figures 6A, 6B:
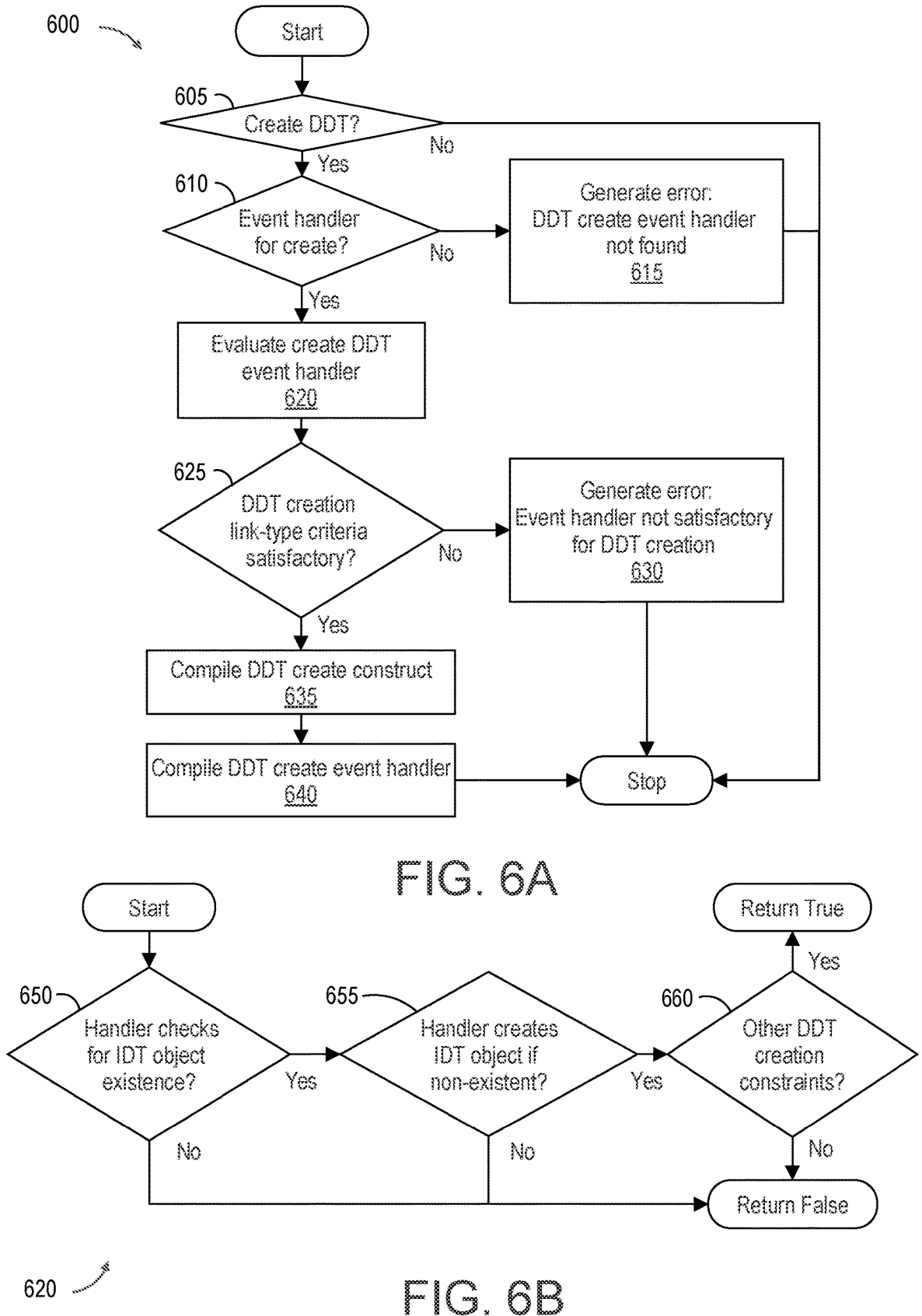
FIG. 6A is a flowchart 600 illustrating functions of DDT creation compile-time check 455 of FIG. 4B.
FIG. 6B is a flowchart of an example evaluation of a create DDT event handler.

FIG. 6A is a flowchart 600 illustrating functions of DDT creation compile-time check 455 of FIG. 4B. Source code is evaluated for the presence of a create DDT construct (605). Compilation continues if none is found. When a create DDT construct is encountered, the source code is examined to determine if an event handler for the create DDT construct is present (610). If not, then an error is generated (615) to indicate that the DDT create event handler was not found. In type criteria include checking the existence of an associated IDT (650). It will also check to see if the handler creates the associated IDT object when it does not exist (655). There may be other DDT creation constraints that make up the link-type criteria. The event handler is evaluated to ensure it checks for these as well if they are defined (660). If all link-type criteria instructions are found in the code, the event handler is deemed sufficient, and a true value is returned (evaluated in 625). If any of them are missing, a false value is returned, which will lead to generating an error (630).

In this example, before creating a DDT, it is ensured that an associated IDT is available. Its associated IDT is created first if one does not exist. In an alternate embodiment, an IDT is not automatically created. Instead, some other function could be performed, or an error could be generated.

The following code snippet provides an example of a DDT create statement, as well as a DDT create event handler with respect to the Person IDT and Employee DDT defined earlier in FIG. 2.

```
1   @ready(create_emp_web_request)
2     CreatePersonName: create_emp_web_request.parameter{ }(parameter.key ==
      "name").value.to_string
3       CreatePersonAadhaar: create_emp_web_request.parameter{ }(parameter.key
      == "aadhaar").value.to_number
4     CreatePersonAge: create_emp_web_request.parameter{ }(parameter.key ==
      "age").value.to_number
5     CreateEmpDesignation: create_emp_web_request.parameter{ }(parameter.key ==
      "designation").value.to_string
6     e1 <- create('Employee', person: ('Person', name: create_person_name, aadhaar:
      create_person_aadhaar, age: create_person_age),
      designation:create_emp_designation)
7
8   @before(create(Employee))
9       CreatePersonAadhaar: create_statement.property{ }(property.name ==
          "Aadhaar").value
10      if(exists?(person{ }(person.aadhaar == create_person_aadhaar))
11        person { }(person.aadhaar == create_person_aadhaar).element
``` this case the create DDT construct is not compiled and this process terminates. In one embodiment, the presence in source code of an associated DDT create event handler is sufficient as a minimum requirement to allow compilation to continue.

In another embodiment, the process continues by evaluating the create DDT event handler (620). It determines whether satisfactory DDT creation link-type criteria are included in the event handler (625). These link-type criteria can vary in various embodiments. If the defined link-type criteria are not sufficient (625), an error is generated to indicate that the event handler performance is not satisfactory for DDT creation (630). The link type object management construct and its associated event handler are not compiled, and this process terminates.

When the event handler exists for the link type object management construct (610) and DDT creation link-type criteria (if any) are satisfactory (625), then the DDT create construct is compiled (635) and the DDT create event handler is compiled as well (640). Note that, in some instances, there may be multiple create DDT constructs in source code, each of which share a single create DDT event handler. As such, the compile DDT create event handler (640) does not need to be repeated for additional DDT create instances of that type, and neither does the existence of the DDT event handler (610) or sufficiency thereof (620) need to be evaluated again.

FIG. 6B is a flowchart of an example evaluation of a create DDT event handler 620. In one embodiment, link- The DDT creation event handler code, @before(create (Employee)), is shown in lines 8-11. It is called in response to the DDT create construct (line 6). In this example, the trigger @ready(create_emp_web_request), line 1, allows a web request for DDT creation at runtime. The create employee web request includes the DDT type (Employee), its associated IDT (Person), IDT properties name, aadhaar and age, and the DDT property 'designation' which are unmarshalled in lines 2-5. Here, el defines the employee object. In this example, an employee instance 'el' will be created at runtime with the values extracted from the web request using the unmarshal process.

The create statement invokes the create DDT event handler to be executed before the creation of the DDT object. In this example, before creation of a DDT object 'el' at runtime, the event handler checks for the existence of the associated IDT object. If the IDT object already exists, it will be used, otherwise it will be created using the information specified in line 6. DDT object creation then follows. The code for identifying the existence of the associated IDT object is the same as used in the create IDT event handler (FIG. 2 lines 15-18) and will operate as detailed above at runtime.

IDT Deletion Compile-Time Check

When a delete statement is recognized by the compiler for an IDT type, as identified by the Link Types and Extensions Analyzer 415, the CT-LTM 420 invokes the IDT Deletion-CTC 460. One aspect is to ensure that a developer has written an IDT deletion event handler. In another aspect, the event handler is evaluated at compile time to ensure it is enforcing the desired criteria prior to the IDT deletion at runtime.

Figure 7A:
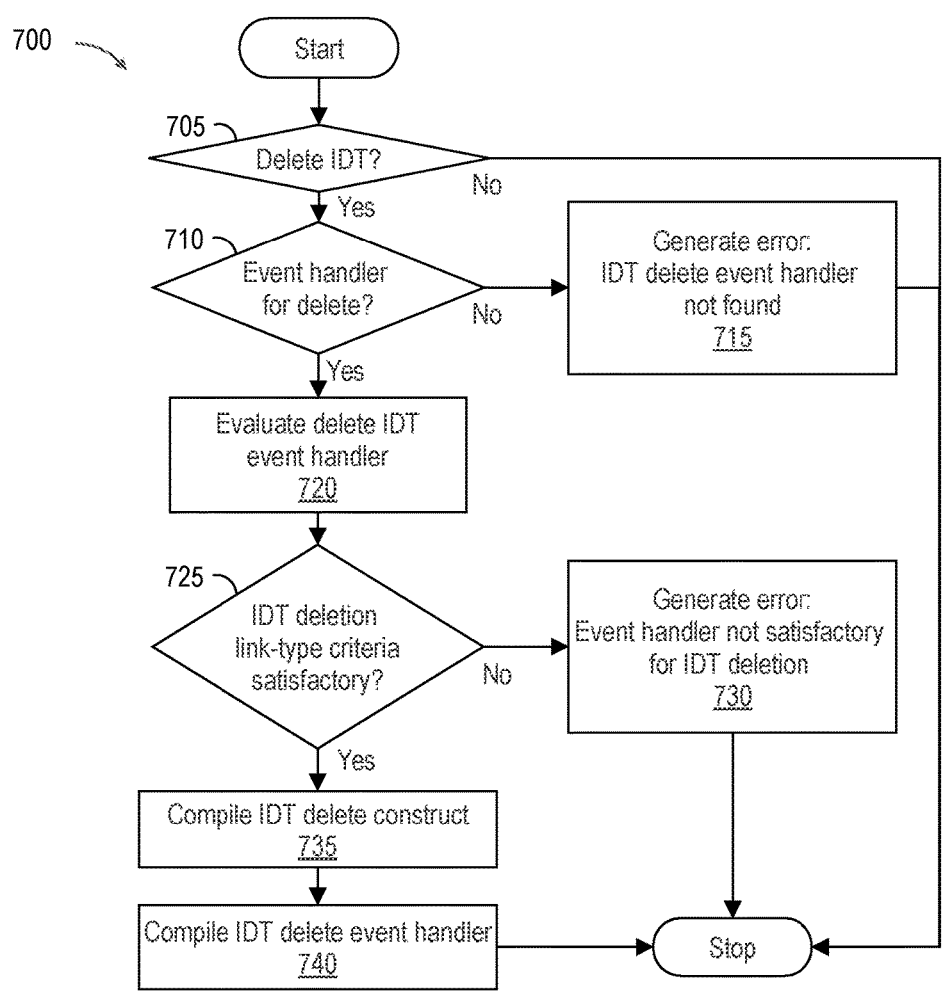
FIG. 7A is a flowchart 700 illustrating functions of IDT deletion compile-time check 460 of FIG. 4B.

FIG. 7A is a flowchart 700 illustrating functions of IDT deletion compile-time check 460 of FIG. 4B. Source code is evaluated for the presence of a delete IDT construct (705). Compilation continues if none is found. When a delete IDT construct is encountered, the source code is examined to determine if an event handler for the delete IDT construct is present (710). If not, then an error is generated (715) to indicate that the IDT delete event handler was not found. In this case the delete IDT construct is not compiled and this process terminates. In one embodiment, the presence in source code of an associated IDT delete event handler is sufficient as a minimum requirement to allow compilation to continue.

In another embodiment, the process continues by evaluating the delete IDT event handler (720). It determines whether satisfactory IDT deletion link-type criteria are included in the event handler (725). These constraints can vary in various embodiments. If the link-type criteria instructions are not sufficient (725), an error is generated to indicate that the event handler performance is not satisfactory for IDT deletion (730). The link type object management construct and its associated event handler are not compiled, and this process terminates.

When the event handler exists for the link type object management construct (710) and IDT deletion link-type criteria (if any) are satisfactory (725), then the IDT delete construct is compiled (735) and the IDT delete event handler is compiled as well (740). Note that, in some instances, there may be multiple delete IDT constructs in source code, each of which share a single delete IDT event handler. As such, the compile IDT delete event handler (740) does not need to be repeated for additional IDT delete instances of that type, and neither does the existence of the IDT event handler (710) or sufficiency thereof (720) need to be evaluated again.

when a request to delete an IDT object with dependent DDT objects is made at runtime, the event handler 720 needs a delete strategy for those DDTs, as well as any other dependencies of the IDT. Example delete strategies include generating an error rather than deleting, automatically deleting DDTs and dependencies as just described, or deleting DDTs conditionally, based on constraints. The delete IDT event handler can have one or more strategies prescribed for various types, and the IDT deletion compile-time check 460 can evaluate the event handler at compile time to ensure the desired functionality of the event handler during runtime.

Figure 7B:
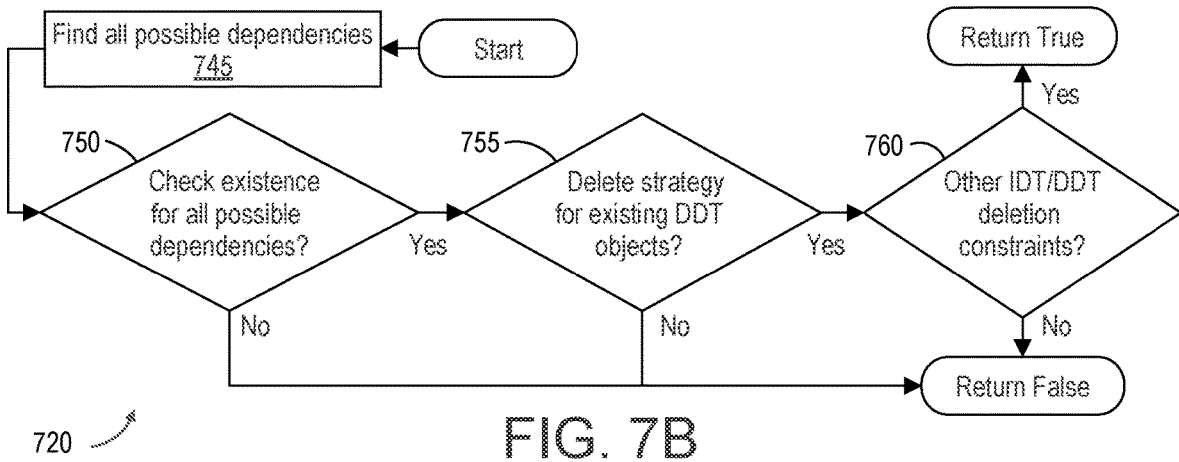
FIG. 7B is a flowchart of an example evaluation of a delete IDT event handler.

FIG. 7B is a flowchart of an example evaluation of a delete IDT event handler 720. The compiler finds all the possible dependencies for the IDT type identified by the delete IDT construct (745). For example, there may several DDT types defined in source code that reference the IDT. Link-type criteria here includes making sure each of those DDT types are examined in the event handler. In this embodiment, the event handler will include instructions for checking for the existence of each dependency associated with the IDT (750). It will also check to see if the handler performs a prescribed delete strategy for any existing DDT objects (755). There may be other IDT or DDT deletion constraints that make up the link-type criteria. The event handler is evaluated to ensure it checks for these as well if they are defined (760). If all required link-type criteria instructions are found in the code, the event handler is deemed sufficient, and a true value is returned (evaluated in 725). If any of them are missing, a false value is returned, which will lead to generating an error (730).

The following code snippet illustrates an example IDT deletion event handler code with respect to the Person IDT and Employee DDT defined in FIG. 2.

```
1  @ready(delete_person_web_request)
2  DeletePersonAadhaar: delete_person_web_request.parameter{ }(parameter.key ==
   "aadhaar").value.to_number
3    <- delete(person{ }(person.aadhaar == delete_person_aadhaar).element)
4
5  @before(delete(object.is?(person))
6      PersonConstraint{ }: get_all_constraint{ }(object.is?(person))
7      if (validate_constraints(person_constraint{ }))
8        <- create(error("IDT cannot be deleted")) # displays error and exits
9      else
10         if(exists?(employee{ }(employee.person == person).element)
11           <- delete(employee{ }(employee.person == person).element)
```

In a linked relationship, the IDT and DDT objects are maintained independently with unique system-generated IDs, regardless of how they were created. Due to this independent maintenance of objects, the deletion of DDT and IDT objects are performed in a distinct way.

When a DDT object is deleted, its corresponding IDT object is retained, which can be used in the future, if necessary. In one example of IDT object deletion, all its associated DDT and IDTE objects are deleted by default. This automatic cascaded deletion of associated DDT and IDTE may not be favorable in some situations. The developers may not expect such DDT and IDTE deletions. In an alternative embodiment, controls are provided to handle the deletion of IDT objects, established by user-defined constraints for deletion in the link-type criteria instructions.

There are a variety of options for a delete IDT event handler 720. When an IDT object exists without any dependent DDT objects, nor any other dependencies, then the decision to delete the IDT is not complicated. However, The IDT deletion event handler code, @before(delete (object.is?(person)), is shown in lines 5-11. It is called in response to the IDT delete construct (line 3). In this example, the trigger @ready(delete_person_web_request), line 1, allows a web request for IDT deletion at runtime. From the delete person web request, the unique property named 'aadhaar' is extracted in line 2. This is compared with the person objects in the database using the aadhaar property to fetch the relevant object to be deleted as in line 3.

The delete statement in line 3 invokes the delete IDT event handler to be executed before the deletion of the IDT object. In this example, before deletion of the IDT object at runtime, the event handler checks for the existence and satisfaction of the IDT constraints as in lines 6 and 7 respectively. If the IDT constraints exists, and evaluate to true, the IDT object is not deleted. This is shown as error message in line 8.

In this example, at compile time, the compiler also identifies DDT types that can be associated with the IDT Person (745) in the else option of the example code (lines 9-11). Any number of additional DDTs could be associated with type Person. The compiler verifies that all those possibilities are included in the IDT delete event handler (720) at compile time. There is also a DDT deletion strategy present, verified by the compiler (755), which is to delete the employee DDT when the person is deleted. Note that this employee delete statement (line 11) can also cause a DDT delete event handler to be invoked, which can be evaluated by DDT Deletion compile-time check 465 (detailed further below).

IDT Deletion-CTC 460 verifies that the event handler checks for the IDT constraints first whose evaluation will determine if an IDT can be deleted or not. If the IDT constraints evaluate to true, the IDT object is not deleted. Subsequently, any dependencies of an IDT are taken into consideration for all its associated DDT objects. If one or more associated DDT objects are present, then the link-type criteria ensure that the associated DDT objects are deleted before the IDT object deletion.

The DDT object deletion allows the handler to check whether any DDT specific constraints exist applicable for the delete strategy (755). During runtime, the event handler will locate DDT objects that exist associated with the IDT, and evaluate the constraints as compiled in the event handler. After successfully validating the constraints, the handler allows DDT object deletion to occur, followed by IDT object deletion.

DDT Deletion Compile-Time Check

When a delete statement is recognized by the compiler for a DDT type, as identified by the Link Types and Extensions Analyzer 415, the CT-LTM 420 invokes the DDT Deletion-CTC 465. One aspect is to ensure that a developer has written a DDT deletion event handler. In another aspect, the event handler is evaluated at compile time to ensure it is enforcing the desired link-type criteria prior to the DDT deletion.

to indicate that the event handler performance is not satisfactory for DDT deletion (830). The link type object management construct and its associated event handler are not compiled, and this process terminates.

When the event handler exists for the link type object management construct (810) and DDT deletion link-type criteria (if any) are satisfactory (825), then the DDT delete construct is compiled (835) and the DDT delete event handler is compiled as well (840). Note that, in some instances, there may be multiple delete DDT constructs in source code, each of which share a single delete DDT event handler. As such, the compile DDT delete event handler (840) does not need to be repeated for additional DDT delete instances of that type, and neither does the existence of the DDT event handler (810) or sufficiency thereof (820) need to be evaluated again.

Figure 8A:
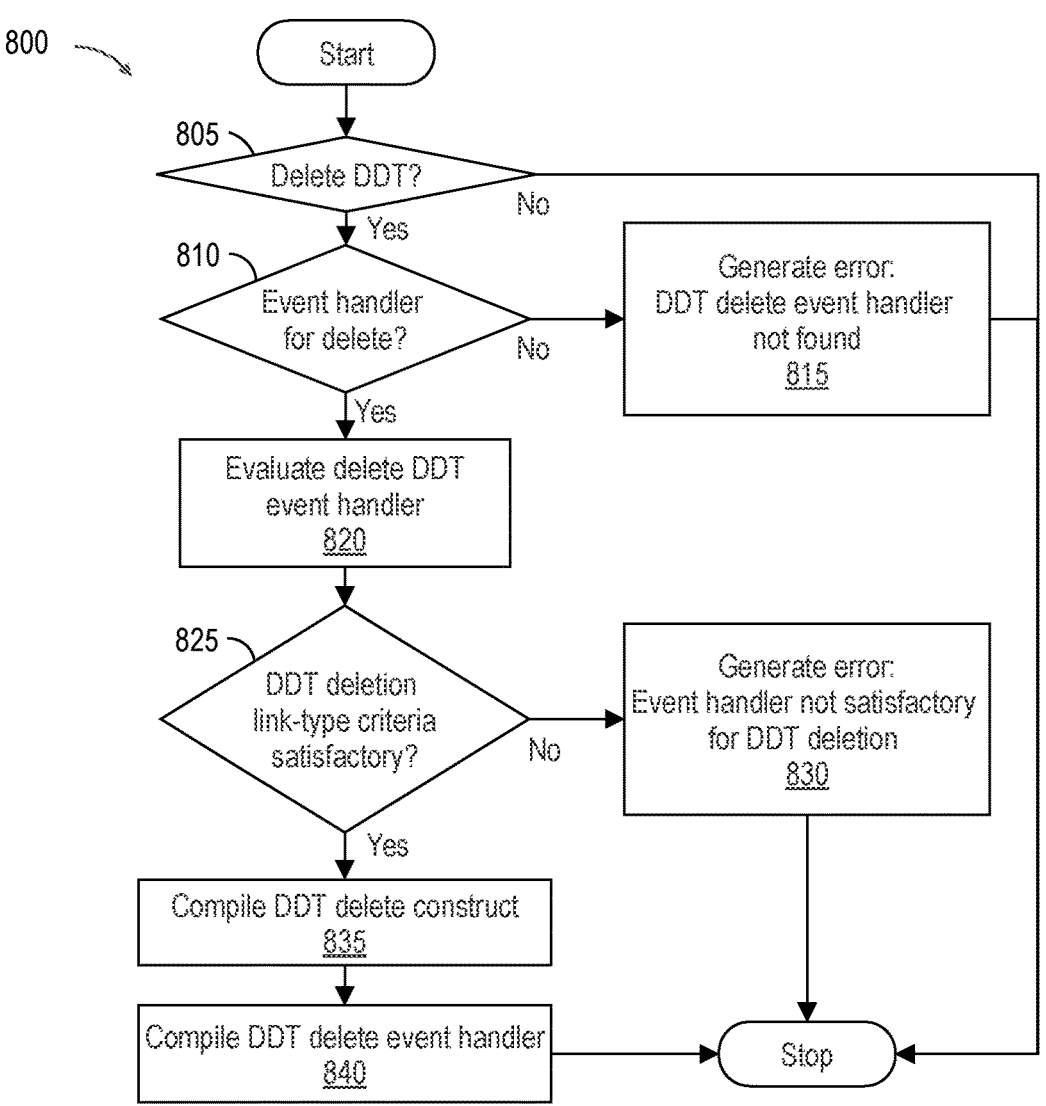
FIG. 8A is a flowchart 800 illustrating functions of DDT deletion compile-time check 465.
Figure 8B:
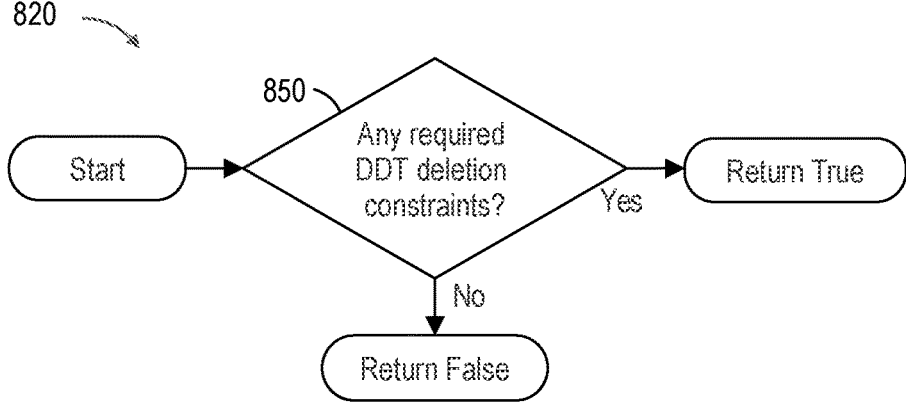
FIG. 8B is a flowchart of an example evaluation of a delete DDT event handler.

FIG. 8B is a flowchart of an example evaluation of a delete DDT event handler 820. In this example, the link-type criteria for DDT deletion include any user-defined constraints related to DDT. It is possible to have no constraints. The event handler is evaluated to ensure it checks for these if they are defined (850). If the appropriate link-type criteria are found in the code, the event handler is deemed sufficient, and a true value is returned (evaluated in 825). If any of them are missing, a false value is returned, which will lead to generating an error (830).

Note that the flowcharts of FIGS. 8A and 8B can support an update object management function (with optional update constraints) by simply replacing delete with update. In the example embodiment, the update function is the same for an IDT and a DDT, although that is not mandatory. Details not shown.

The following code snippet illustrates example DDT deletion event handler code with respect to the Employee DDT defined earlier.

```
1  @ready(delete_emp_web_request)
2
3  DeleteEmpAadhaar:delete_emp_web_request.parameter{ }(parameter.key ==
   "aadhaar").value.to_number
4    <- delete(employee{ }(employee.aadhaar == delete_emp_aadhaar).element)
5
6  @before(delete(object.is?(employee))
7    EmployeeConstraint{ }:get_all_constraint{ }(object.is?(employee))
8    if validate_constraints(employee_constraint{ })
9      <- create(error("DDT cannot be deleted")) # displays error and exits
```

FIG. 8A is a flowchart 800 illustrating functions of DDT deletion compile-time check 465 of FIG. 4B. Source code is evaluated for the presence of a delete DDT construct (805). Compilation continues if none is found. When a delete DDT construct is encountered, the source code is examined to determine if an event handler for the delete DDT construct is present (810). If not, then an error is generated (815) to indicate that the DDT delete event handler was not found. In this case the delete DDT construct is not compiled and this process terminates. In one embodiment, the presence in source code of an associated DDT event handler is sufficient as a minimum requirement to allow compilation to continue.

In another embodiment, the process continues by evaluating the delete DDT event handler (820). It determines whether satisfactory DDT deletion link-type criteria are included in the event handler (825). These constraints can vary in various embodiments. If the defined link-type criteria instructions are not sufficient (825), an error is generated The @ready and delete constructs, lines 1-3, are similar to those described above, except in this case the type and object is DDT employee instead of IDT person. As detailed above, during compile time, in response to encountering the delete construct, the DDT Deletion compile-time check 465 of compile-time link type manager 425 evaluates the DDT delete event handler, lines 5-8, to ensure its existence, and optionally to evaluate its functionality.

During runtime, when the instructions derived from the delete construct are encountered, the corresponding event handler is invoked, identified by the @before, derived from lines 5-8. EmployeeConstraint is defined to collect all the constraints related to the employee object (line 6). Here, the sequence "get_all_constraint" refers to DDT-related constraints only. In other scenarios, for example when a type is both an IDT and a DDT, then get_all_constraint will retrieve all applicable constraints. Line 7 validates the constraints obtained in line 6.

If the constraint evaluates to true, the event handler returns an error (line 8). An error message may be appended to a log file, which may include information about the constraint validation. Other error-handling procedures may be deployed in alternate embodiments. Other error-handling procedures may be deployed in alternate embodiments. In this case, the DDT employee object is not deleted. If the constraint evaluates to false, then the DDT employee object is deleted. Note that the IDT object person, that was linked with a deleted employee object, is not affected by the DDT delete. Other error-handling procedures may be deployed in alternate embodiments.

The following code snippet is used to explain the working of the get_all_constraints{ } function that applies to the IDT deletion event handler and the DDT deletion event handler with regard to the user-defined constraints.

```
 1  Person:= Type
 2    Name:= String
 3    Aadhaar:= Number(unique) # ID Property
 4    Age:=Number
 5    !AgeDelete: error(person.age>60)
 6    # Person older than 60 throws and error
 7    !PersonDelete: error(exists(person.employee))
 8    # Person having an Employee role throws and error
 9
10  Employee:= Person #DDT
11    Designation:= String
12    # A computed property is defined below
13    !EmployeeDelete: error(employee.designation == "MLS")
14    #if the Employee is "MLS", it throws and error.
```

As shown in line 5, a programmer can include a user-defined constraint, for a Person IDT, by introducing a computed property named "AgeDelete" using the "!" symbol. Here "AgeDelete" is computed as "error (person.age>60)". So, if person.age is greater than 60 then "AgeDelete" will indicate an error. Similarly, as shown in line 7, a programmer can include another user-defined constraint, for a Person IDT, by introducing a computed property named "PersonDelete" using the "!" symbol. Here "PersonDelete" is computed as "error(exists(person.employee))". So, if the person has an employee role, "PersonDelete" will indicate an error.

A programmer can include another user-defined constraint, for an Employee DDT, by introducing a computed property named "EmployeeDelete" using the "!" symbol (line 13). Here "EmployeeDelete" is computed as "error (employee.designation=="MLS"). So, if employee.designation is "MLS" then "EmployeeDelete" will indicate an error.

As described above a programmer can include multiple user-defined constraints, for both Person IDT and Employee DDT, by introducing computed properties using the "!" symbol. The computed properties for the Person IDT which reflect user-defined constraints are used in a function/ method such as "get_all_constraint{ }(object.is?(person))" which provides all constraints for the current person object (intended to be deleted). Similarly, the computed properties for the Employee DDT which reflect user-defined constraints are used in a function/method such as "get_all_constraint{ }(object.is?(employee))" which provides all constraints for current employee object. Other functions could be developed to retrieve constraints only applicable to a single object management function, such as get_all_delete_constraint, get_all_update_constraint, or get_all_create_constraint.

In one scenario the functions or methods such as "get_all_constraint{ }(object.is?(person))" and "get_all_constraint{ }(object.is?(employee))" may be provided as built-in functions or methods of the programming language. In another scenario they may be provided by the programmer. As described herein these functions or methods may be used in handlers for any object management functions to check the user-defined constraints for the relevant function.

The . . . Delete construct of line 7 in the following code snippet illustrates an example of an extensible built-in object management function, as detailed in the aforementioned 'xxx application. As described in detail therein, the extension indicator . . . Delete extends the delete function for the type in which it is defined, in this case type Person. The constraint !PersonDelete will be used to extend the built-in delete function when it is called on objects of type Person. The constraint expression will be evaluated at runtime during the delete function, and, if the constraint expression evaluates to a predetermined value, the delete function will not be completed.

```
 1  Person:= Type
 2    Name:= String
 3    Aadhaar:= Number(unique) # ID Property
 4    Age:=Number
 5    !AgeDelete: error(person.age>60)
 6    # Person older than 60 throws and error
 7    ...Delete
 8    !PersonDelete: error(exists(person.employee))
 9    # Person having an Employee role throws an error and
       this is associated with Delete operation
```

Figure 9:
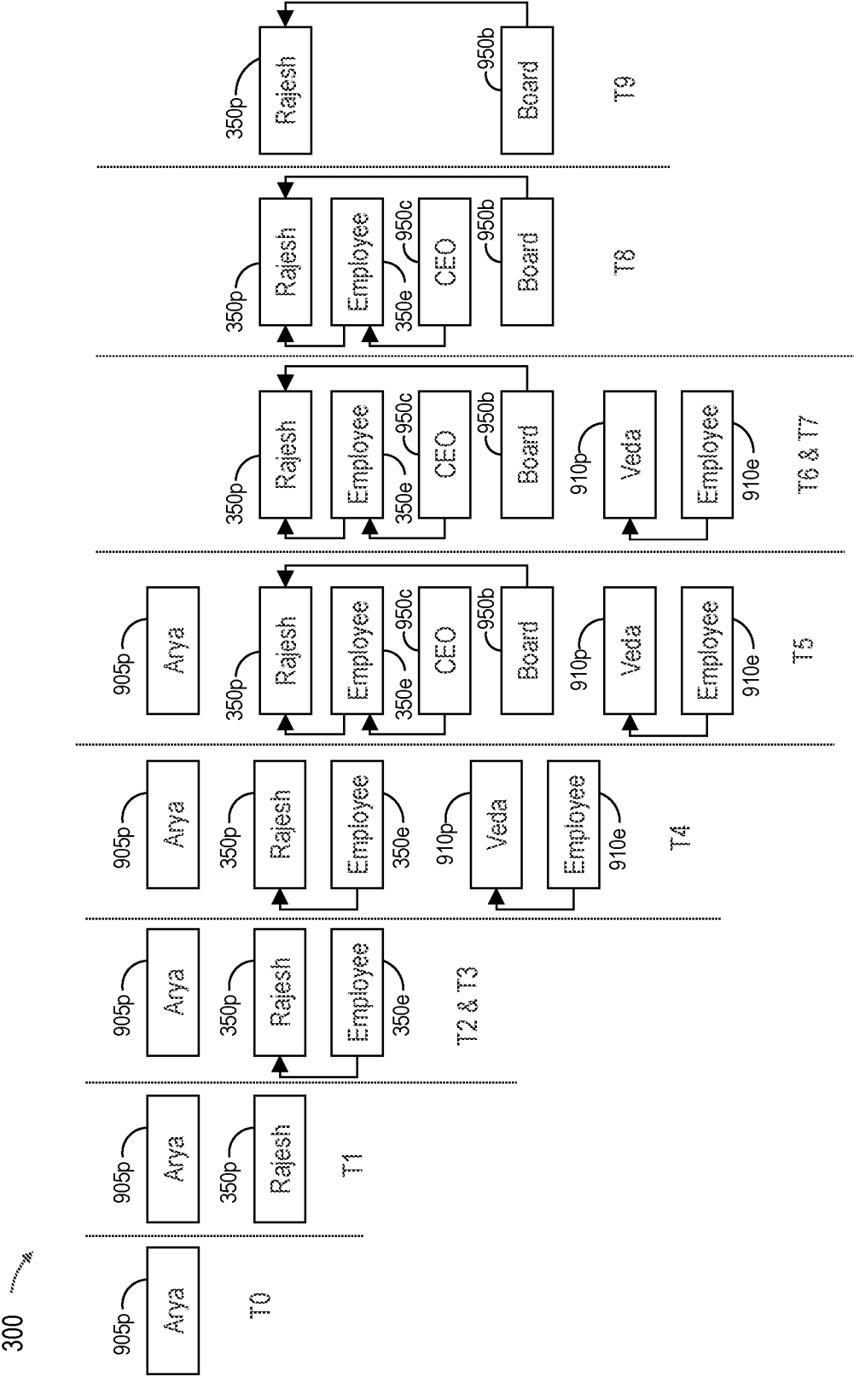
FIG. 9 illustrates a memory 300 during runtime following various example link type object management instructions, such as IDT and DDT creations and deletions.

FIG. 9 illustrates a memory 300 during runtime following various example link type object management instructions, such as IDT and DDT creations and deletions. For this example, executable program 220 and memory management system 370 operate in a runtime environment to modify a memory 300 (such as those described above with respect to FIG. 3) to instantiate and delete objects in response to illustrative runtime IDT and DDT link type object management events. Memory 300 is described using simplified representations of these IDT and DDT objects at various times identified as time periods T0-T9.

Assume for this illustration that executable program 220 has been compiled with create and delete statements for IDTs and DDTs and verified corresponding event handlers as processed by Compile-time Link Type Manager 425. Also introduced are two new DDT types (details not shown). One is a DDT type Board, which links with type Person. A second is a DDT type CEO, which links with type Employee. Therefore, in this example, an object of type employee can be both a DDT (dependent on Person) and an IDT (with respect to dependency CEO). Although any create or delete constructs could be used, assume for this illustration that the delete and create events occur in response to web requests.

At T0, memory 300 already comprises one IDT for person Arya 905p. A create Person Rajesh is encountered. The associated event handler for IDT Person is invoked. It checks for the existence of Person object Rajesh and finds that one does not exist. It also evaluates any other IDT creation constraints that exist, and determines there is no constraint preventing creation, so IDT object Rajesh 350p is created. The result is shown at time T1, where person objects Arya 905p and Rajesh 350p exist.

The next link type object management event is a create Employee for Person Rajesh. The associated event handler for DDT Employee is invoked. It checks for the existence of the associated IDT object, Person object Rajesh, and finds it.

It also evaluates any other DDT creation constraints that exist, and determines there is no constraint preventing creation, so DDT object Employee 350e is created, and linked to Person object 350p. The result is shown at time T2, where person objects Arya 905p and Rajesh 350p exist, along with dependent employee object 350c.

Next, a create Person event is encountered for Arya. This is an example of an IDT create for an existing IDT. In this case, the event handler locates the existing person object 905p for Arya, so no new object is created. The result for T3 is shown, which is the same as at T2.

Another create Employee event is encountered, this time for Veda. This is an example of a DDT create where the associated IDT does not exist. As such, the IDT create event handler calls for a create of the Person Veda, 910p, and then creates linked Employee Veda 910c. It is assumed that other IDT/DDT constraints were satisfied. The result is shown at time T4, where person objects Arya 905p, Rajesh 350p, and Veda 910p exist, along with dependent employee objects 350e and 910c.

For the next illustration, Rajesh receives a promotion to CEO, which includes a position on the board of directors. There are two create DDT events, which can happen in any order. Employee 350e exists, and, while existing as a DDT for Person Rajesh, it also acts as an IDT for DDT type CEO. Had Employee object 350e not existed for Rajesh, one could have been created, as for any IDT during DDT creation. Here, it did exist, so CEO object 950c linked to DDT/IDT object 350e is created. Second, a DDT object Board 950b linked with Person Rajesh 350p is created. The result is shown at time T5, where person objects Arya 905p, Rajesh 350p, and Veda 910p exist, dependent employee objects 350e and 910e exist, and dependent objects Board 950b and CEO 950c exist.

Now a delete IDT event for Arya is encountered. In this example, Arya has no dependencies, so unless there are other user-defined constraints, there is nothing to prevent the deletion of IDT Person Arya. Assume there are no other preventative constraints, so Arya person 905p is deleted. Memory management system 370 would make the appropriate updates to the object table 380 and memory associated with the object deleted is released for reuse (details not shown). Now memory 300, at time T6, includes person objects Rajesh 350p and Veda 910p, dependent employee objects 350e and 910e, and dependent objects Board 950b and CEO 950c.

Next a delete IDT event for Veda is encountered. In this example, IDT Person object 910p has dependent object 910e associated with it. A variety of alternate design choices for IDT delete event handlers are detailed above. For example, deleting any associated DDTs with an IDT delete is one option. In that case Veda person and employee would both be deleted. User-defined constraints can also be used to regulate deletion of one or more DDT objects when an IDT delete is called for. So, if constraints for a DDT allow it, a delete IDT can delete both the DDT and the IDT. Or, if at least one constraint for at least one DDT prevents DDT deletion, the IDT should remain, so as not to orphan the linked DDT. For illustration purposes, assume that in this case the event handler prevents the deletion of the IDT when associated DDTs exist. So, while Veda employee 910e exists, deletion of Veda person 910p does not occur. Thus, the result at T7 is the same as T6.

A delete DDT request for Employee Veda is then encountered. Assume there are no user-defined criteria that would prevent deletion in this example. Since Employee Veda 910c is a DDT (and is not an IDT to another type), it can be deleted, while leaving Person Veda 910p in place and unmodified (although the dependency list in object table 380 would naturally be updated with the removal of dependency 910e). A second delete IDT event for Veda is encountered. This time, IDT Person object 910p has no dependent object associated with it, the employee DDT having just been removed. Barring another user-defined constraint, none existing in this example, Person object 910p for Veda is deleted. The result is shown at time T8, where only IDT object Rajesh person 350p, DDT/IDT object Rajesh employee 350e, DDT object Rajesh employee CEO 950c, and DDT object Rajesh Board 950b exist.

Assume for illustration that type CEO has a user-defined constraint that allows it to be deleted whenever its linked object employee is deleted. Then when a delete DDT request for employee Rajesh 350e is encountered, the event handler will find that the object exists, both a DDT to a Person object, but also an IDT relating to object CEO. In this example, the constraints allowing deletion of object CEO 950c will be satisfied, and the deletion of DDT CEO 950c occurs. And, as a DDT with respect to IDT Person Rajesh, barring other user-defined constraints, then deletion of DDT employee 350e also occurs. The result is shown at T9. Here, Person object Rajesh 350p remains, unaltered by deletion of his role as employee. While, in this case, his role as CEO was linked with his role as an employee, his ability to be a member of the board remains, as type Board is dependent only on Person, not Employee.

There could be different constraints. For example, it could be a requirement that at least one other employee with role CEO exists before a CEO (and its associated employee object) are deleted. There could be minimum size requirements for a team, as another example, that would limit deletions of employees of the team once the limit is reached. There are unlimited possible combinations of linked objects with customizable event handlers to regulate their creation and deletion, and just a subset of illustrative features is identified in FIG. 9.

Figure 10:
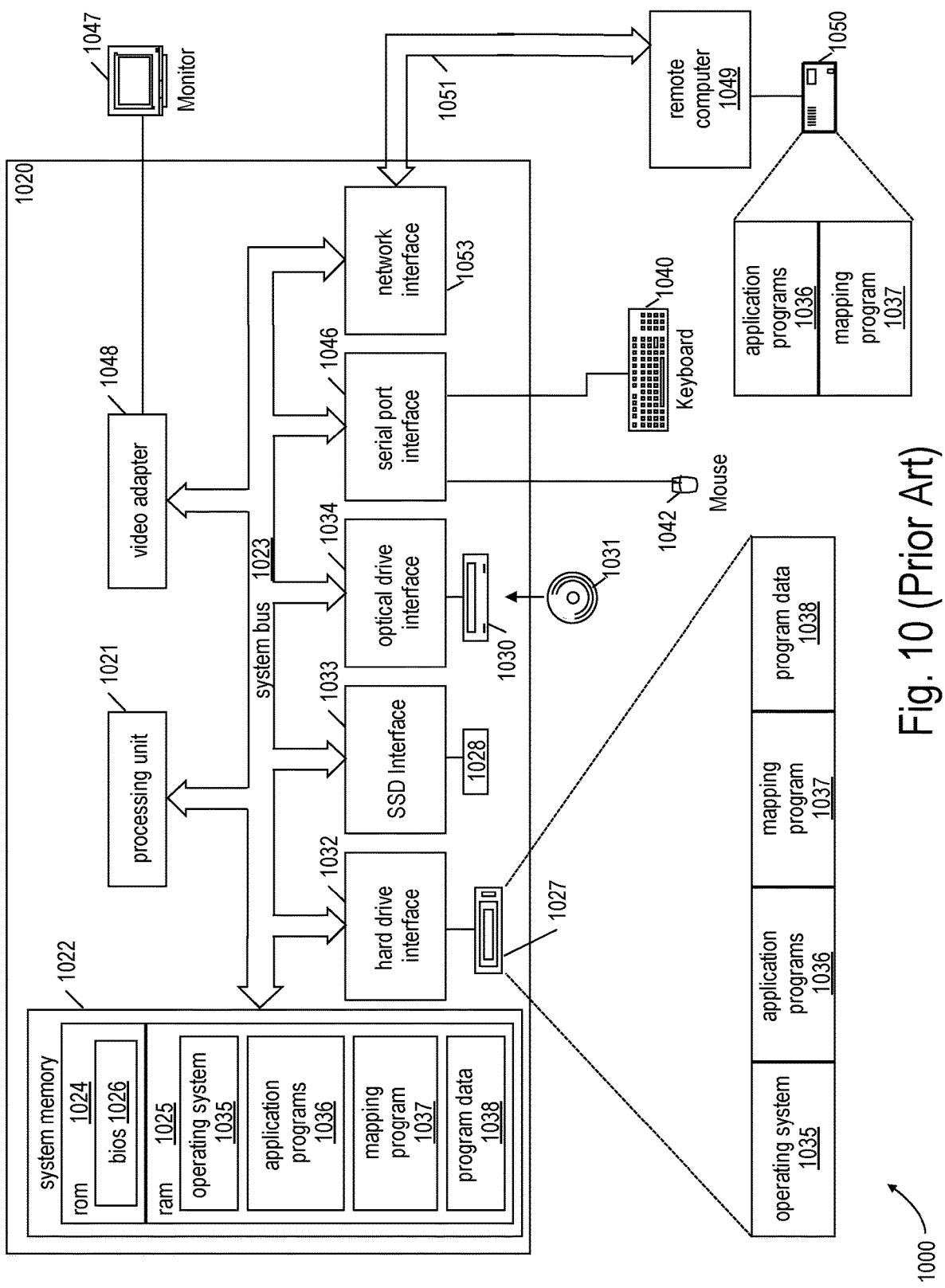
FIG. 10 depicts a prior art general-purpose computing system 1000.

FIG. 10 (prior art) depicts a general-purpose computing system 1000 that can serve as a client or a server depending on the program modules and components included. One or more computers of the type depicted in computing system 1000 can be configured to perform operations described above. For example, computing system 1000 is suitable to run a compiler such as detailed above in FIGS. 4A and 4B. Computing system 1000 may run program executables 220, in a runtime environment, embodying memory 300 of FIG. 3. Those of skill in the art will appreciate that the invention may be practiced using other system configurations, including hand-held devices, multiprocessor systems, microprocessor-based or programmable consumer electronics, network PCs, minicomputers, mainframe computers, and the like.

Computing system 1000 includes a conventional computer 1020, including a processing unit 1021, a system memory 1022, and a system bus 1023 that couples various system components including the system memory to the processing unit 1021. The system bus 1023 may be any of several types of bus structures, including a memory bus or memory controller, a peripheral bus, and a local bus using any of a variety of bus architectures. The system memory includes read only memory (ROM) 1024 and random-access memory (RAM) 1025. A basic input/output system 1026 (BIOS), containing the basic routines that help to transfer information between elements within the computer 1020, such as during start-up, is stored in ROM 1024. The computer 1020 further includes a hard disk drive 1027 for reading from and writing to a hard disk, not shown, a solid-state drive 1028 (e.g., NAND flash memory), and an optical disk drive 1030 for reading from or writing to an optical disk 1031 (e.g., a CD or DVD). The hard disk drive 1027 and optical disk drive 1030 are connected to the system bus 1023 by a hard disk drive interface 1032 and an optical drive interface 1034, respectively. The drives and their associated computer-readable media provide nonvolatile storage of computer readable instructions, data structures, program modules and other data for computer 1020. Other types of computer-readable media can be used.

Program modules are stored on non-transitory, computer-readable media such as disk drive 1027, solid state disk 1028, optical disk 1031, ROM 1024, and RAM 1025. The program modules include an operating system 1035, one or more application programs 1036, other program modules 1037, and program data 1038. An application program 1036 can use other elements that reside in system memory 1022 to perform the processes detailed above.

A user may enter commands and information into the computer 1020 through input devices such as a keyboard 1040 and pointing device 1042. Other input devices (not shown) may include a microphone, joystick, game pad, satellite dish, scanner, or the like. These and other input devices are often connected to the processing unit 1021 through a serial port interface 1046 that is coupled to the system bus, but may be connected by other interfaces, such as a parallel port, game port, universal serial bus (USB), or various wireless options. A monitor 1047 or other type of display device is also connected to the system bus 1023 via an interface, such as a video adapter 1048. In addition to the monitor, computers can include or be connected to other peripheral devices (not shown), such as speakers and printers.

The computer 1020 may operate in a networked environment using logical connections to one or more remote computers, such as a remote computer 1049. The remote computer 1049 may be another computer, a server, a router, a network PC, a peer device, or other common network node, and typically includes many or all the elements described above relative to the computer 1020, although only a memory storage device 1050 has been illustrated in FIG. 10 for simplicity. The logical connections depicted in FIG. 10 include a network connection 1051, which can support a local area network (LAN) and/or a wide area network (WAN). Such networking environments are commonplace in offices, enterprise-wide computer networks, intranets, cellular data systems, and the Internet in general. Furthermore, network 1051 may connect to any number of distributed systems such as cloud-based storage or other web-based applications.

Computer 1020 includes a network interface 1053 to communicate with remote computer 1049 via network connection 1051. In a networked environment, program modules depicted relative to the computer 1020, or portions thereof, may be stored in the remote memory storage device. It will be appreciated that the network connections shown are exemplary and other means of establishing a communication link between the computers may be used.

The foregoing description of the implementations of the present techniques and technologies has been presented for the purposes of illustration and description. This description is not intended to be exhaustive or to limit the present techniques and technologies to the precise form disclosed. Many modifications and variations are possible in light of the above teaching. It is intended that the scope of the present techniques and technologies are not limited by this detailed description. The present techniques and technologies may be embodied in other specific forms without departing from the spirit or essential characteristics thereof. The modules, routines, features, attributes, methodologies, and other aspects of the present disclosure can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, and not limiting. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A method of compiling source code, the method comprising:
   encountering, in the source code, an object-management construct directed to a data type for defining an object, the object-management construct defining object-management instructions for affecting the object;
   searching for an event-handler construct in the source code, the event-handler construct assigned to the object-management construct and the data type, the event-handler construct defining event-handler instructions to execute at runtime;
   evaluating the event-handler construct to determine whether the event-handler construct defines event-handler instructions satisfying predetermined criteria; and
   compiling, responsive to the event-handler instructions satisfying the predetermined criteria, a first intermediate-language representation corresponding to the object-management construct operating on the data type.

2. The method of claim 1, further comprising flagging an error responsive to an absence of the event handler.

3. The method of claim 1, wherein the object-management construct comprises at least one of a delete construct, a create construct, and an update construct.

4. The method of claim 1, wherein the source code comprises:
   a second data type for defining a second object, the second data type referencing the data type, such that the second object is linked to the object.

5. The method of claim 1, further comprising flagging an error responsive to the event-handler instructions not satisfying the predetermined criteria.

6. The method of claim 1, further comprising:
   compiling a second intermediate-language representation corresponding to the event-handler construct operating on the object-management construct and the data type.

7. The method of claim 1, wherein the predetermined criteria comprises determining the event-handler instructions include:
   evaluating a constraint at runtime; and
   preventing operation of the object-management construct at runtime responsive to the constraint being satisfied.

8. The method of claim 1, wherein the predetermined criteria comprises determining the event-handler instructions include identifying the existence of an independent data type object.

9. The method of claim 8, wherein the existence of the independent data type object is identified in accordance with an element of the independent data type object attributed as unique.

10. The method of claim 1, wherein the predetermined criteria comprises determining the event-handler instructions include identifying the existence of a dependent-link data type object.

11. A system comprising:

a processor; and a memory storing instructions that, when executed by the processor, cause the processor to:

encounter an object-management construct directed to a first data type for defining an object;

search for an event-handler construct assigned to the object-management construct and the data type;

evaluate the event-handler construct to determine whether it defines event-handler instructions satisfying predetermined criteria; and compile, responsive to the event-handler instructions satisfying the predetermined criteria, an intermediate-language representation corresponding to the object-management construct operating on the data type.

12. The system of claim 11, wherein the object-management construct comprises a delete, create, or update construct.

13. The system of claim 11, wherein the instructions cause the processor to flag an error responsive to an absence of the event-handler construct.

14. The system of claim 11, wherein a source code comprises a second data type referencing the first data type, such that a second object of the second data type is linked to the object.

15. The system of claim 11, wherein the instructions further cause the processor to flag an error responsive to the event-handler instructions not satisfying predetermined criteria.

16. The system of claim 11, wherein the predetermined criteria comprise determining the event-handler instructions include evaluating a constraint at runtime and preventing operation of the object-management construct responsive to the constraint being satisfied.

17. The system of claim 11, wherein the predetermined criteria comprise determining the event-handler instructions include identifying the existence of an independent data type object.

18. The system of claim 11, wherein the predetermined criteria comprise determining the event-handler instructions include identifying the existence of a dependent-link data type object.

19. The system of claim 11, wherein the memory further stores instructions that, when executed by the processor, cause the processor to compile a second intermediate-language representation corresponding to the event-handler construct operating on the object-management construct and the data type.

* * * * *